United States Patent
Seetharamaiah et al.

(10) Patent No.: US 12,126,644 B2
(45) Date of Patent: Oct. 22, 2024

(54) METHODS AND APPARATUS TO IDENTIFY AND REPORT CLOUD-BASED SECURITY VULNERABILITIES

(71) Applicant: Skyhigh Security LLC, Plano, TX (US)

(72) Inventors: Sriranga Seetharamaiah, Bangalore (IN); Cedric Cochin, Hillsboro, OR (US)

(73) Assignee: Skyhigh Security LLC, Plano, TX (US)

( * ) Notice: Subject to any disclaimer, the term of this patent is extended or adjusted under 35 U.S.C. 154(b) by 268 days.

(21) Appl. No.: 17/745,743

(22) Filed: May 16, 2022

(65) Prior Publication Data

US 2022/0279012 A1  Sep. 1, 2022

Related U.S. Application Data

(63) Continuation of application No. 16/728,905, filed on Dec. 27, 2019, now Pat. No. 11,368,479.

(30) Foreign Application Priority Data

Sep. 27, 2019  (IN) .............................. 201911039156

(51) Int. Cl.
*H04L 9/40*         (2022.01)
(52) U.S. Cl.
CPC ...... *H04L 63/1433* (2013.01); *H04L 63/1425* (2013.01)
(58) Field of Classification Search
CPC . H04L 63/1433; H04L 63/1425; H04L 63/08; H04L 63/14
See application file for complete search history.

(56) References Cited

U.S. PATENT DOCUMENTS 9,015,832 B1 *  4/2015  Lachwani  ............... G06F 21/52
                                                      726/22
11,019,076 B1 *  5/2021  Jakobsson  ............... H04L 51/42
(Continued)

FOREIGN PATENT DOCUMENTS

CN        115499187 A  *  12/2022
WO    WO-2006118968 A2  *  11/2006  ........... G06F 21/316
(Continued)

OTHER PUBLICATIONS

The Mitre Corporation, "ATT&CK Matrix for Enterprise," The MITRE Corporation, [https://attack.mitre.org] retrieved on Dec. 26, 2019, 3 pages.
(Continued)

*Primary Examiner* — Sarah Su
(74) *Attorney, Agent, or Firm* — Byrne Poh LLP

(57) ABSTRACT

Methods, apparatus, systems, and articles of manufacture are disclosed to identify and report cloud-based security vulnerabilities. An example apparatus includes memory, instructions, and processor circuitry. The example processor circuitry is to execute the instructions to assess a first security vulnerability associated with an application programming interface (API) of a cloud compute network, the first security vulnerability corresponding to at least one call to the API that deviates from a baseline report, the baseline report based on at least one communication in the cloud compute network, and assess a second security vulnerability associated with identity and access management in the cloud compute network based on an entity in the cloud compute network permitted to access a service provided by the cloud compute network, the second security vulnerability corresponding to an unauthorized request to access at least one of a device of the cloud compute network or the service.

20 Claims, 8 Drawing Sheets

(56) References Cited

U.S. PATENT DOCUMENTS

| | | |
|---|---|---|
| 11,368,479 B2 * | 6/2022 | Seetharamaiah ... H04L 63/1425 |
| 11,477,219 B2 * | 10/2022 | Jenkinson ........... H04L 63/0209 |
| 2009/0320136 A1 | 12/2009 | Lambert et al. |
| 2011/0231564 A1 | 9/2011 | Korsunsky et al. |
| 2013/0347107 A1 | 12/2013 | Williams et al. |
| 2016/0203319 A1 * | 7/2016 | Coen ................... G06Q 30/0185 726/25 |
| 2018/0041525 A1 * | 2/2018 | Elgressy ............. H04L 63/1416 |
| 2018/0063085 A1 | 3/2018 | Shanks et al. |
| 2018/0176244 A1 | 6/2018 | Gervais et al. |
| 2018/0234444 A1 | 8/2018 | Kaplan et al. |
| 2018/0359264 A1 | 12/2018 | Sweet et al. |
| 2019/0098037 A1 | 3/2019 | Shenoy, Jr. et al. |
| 2019/0109868 A1 | 4/2019 | Muddu et al. |
| 2019/0260785 A1 * | 8/2019 | Jenkinson ........... H04L 63/1441 |
| 2020/0076814 A1 * | 3/2020 | Cohen ..................... H04L 63/08 |
| 2020/0106793 A1 * | 4/2020 | Vanamali ............ H04L 63/1433 |
| 2020/0358780 A1 | 11/2020 | Anbalagan |
| 2021/0075815 A1 | 3/2021 | dos Santos Silva et al. |
| 2022/0201029 A1 * | 6/2022 | Murphy ................. G06F 30/20 |
| 2024/0098100 A1 * | 3/2024 | Lal ..................... H04L 63/1416 |

FOREIGN PATENT DOCUMENTS

| | | | |
|---|---|---|---|
| WO | WO 2017/053806 | 3/2017 | |
| WO | 2018071356 A1 | 4/2018 | |
| WO | WO-2019102208 A1 * | 5/2019 | ............. H04L 12/66 |

OTHER PUBLICATIONS

International Searching Authority, "International Search Report and Written Opinion," issued in connection with International Application No. PCT/US2020/052918, Dec. 18, 2020, 17 pages.

United States Patent and Trademark Office, "Non-Final Office Action," issued in connection with U.S. Appl. No. 16/728,905, filed Aug. 4, 2021, 14 pages.

United States Patent and Trademark Office, "Notice of Allowance and Fee(s) Due," issued in connection with U.S. Appl. No. 16/728,905, filed Feb. 17, 2022, 8 pages.

International Searching Authority, "International Preliminary Report on Patentability," issued in connection with International Application No. PCT/US2020/052918, Mar. 15, 2022, 9 pages.

* cited by examiner

METHODS AND APPARATUS TO IDENTIFY AND REPORT CLOUD-BASED SECURITY VULNERABILITIES

RELATED APPLICATIONS

This patent arises from a continuation of U.S. patent application Ser. No. 16/728,905, filed on Dec. 27, 2019, which claims priority from Indian Patent Application No. 201911039156, filed on Sep. 27, 2019. U.S. patent application Ser. No. 16/728,905 and Indian Patent Application No. 201911039156 are hereby incorporated herein by reference in their entireties. Priority to U.S. patent application Ser. No. 16/728,905 and Indian Patent Application No. 201911039156 is hereby claimed.

FIELD OF THE DISCLOSURE

This disclosure relates generally to cloud computing, and, more particularly, to methods and apparatus to identify and report cloud-based security vulnerabilities.

BACKGROUND

Cloud computing refers to software and/or services that can be deployed via the Internet and distributed between one or more computers. Cloud computing offers increased computing resources that can be utilized by a user to improve the processing efficiency and/or processing speed of a workload. Typically, a cloud provider offers computing resources and/or services that can be utilized by a user. In some clouds, a cloud provider can deploy one or more virtual machines to provide cloud computing functionality.

Figure 1:
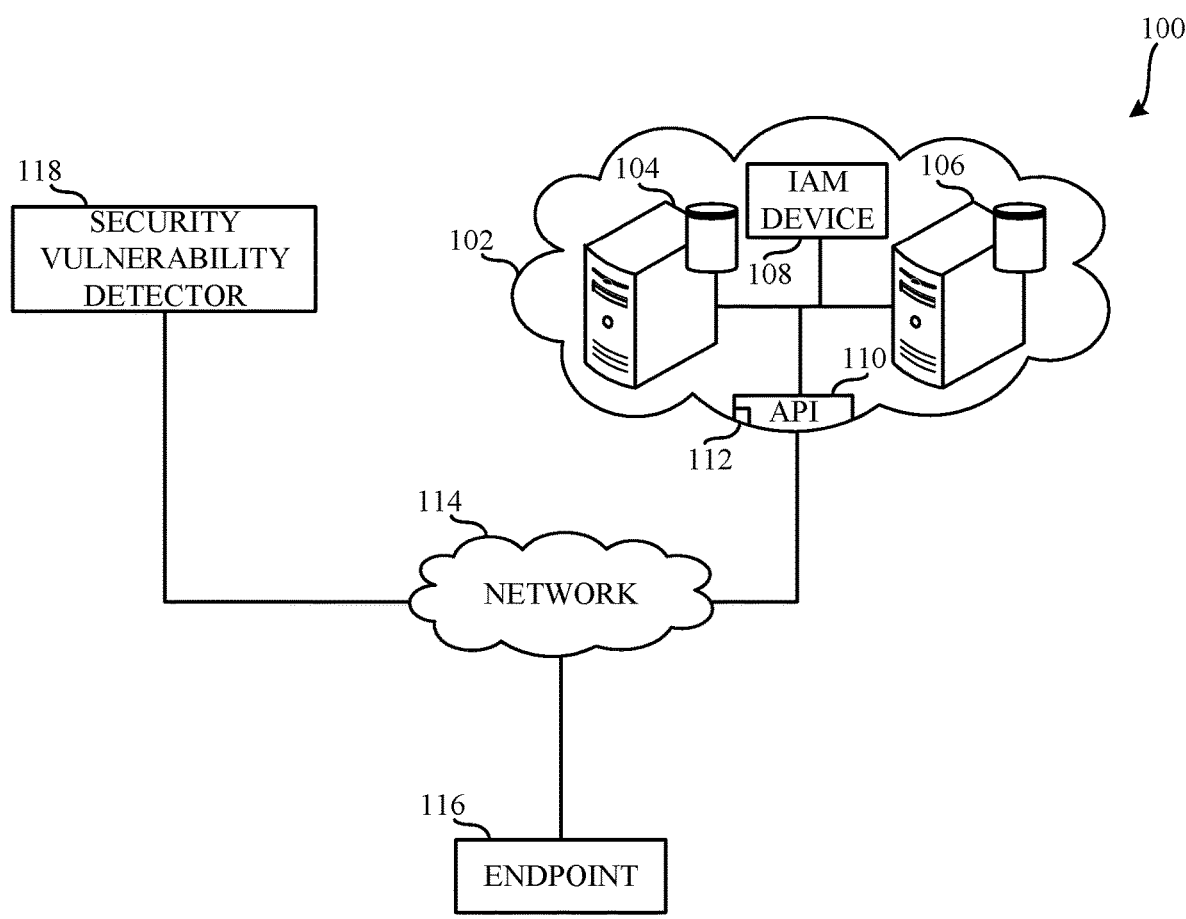
FIG. 1 is a block diagram of an example cloud environment including an example cloud, an example network, an example local endpoint, and an example security vulnerability detector.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Entities (e.g., a business, an information technology (IT) department, an individual, etc.) can set up a network security infrastructure to prevent data exposure caused by vulnerabilities in the organization of operating systems of computing networks (e.g., Local Area Networks (LANs), Wide Area Networks (WAN), Wireless Local Area Networks (WLANs), etc.). To identify the effectiveness of a security solution, a computer security entity can utilize a validation service and/or a validation database (e.g., MITRE Adversarial Tactics Techniques and Common Knowledge (ATT&CK™) Enterprise, etc.). As used herein, computer security refers to the protection of one or more computer systems from theft or damage to the hardware, software, and/or data of the one or more computer systems as well as disruption and/or misdirection of one or more services provided by the one or more computer systems.

For example, the MITRE ATT&CK™ Enterprise includes a listing of tactics and techniques that can be used by nefarious entities to access and/or otherwise attack a network security infrastructure. More specifically, a computer security entity can utilize the MITRE ATT&CK™ Enterprise to identify a successive operation that can be used to exploit a security vulnerability (e.g., a kill chain). A kill chain can include any number of operations, such as, initial access to inject a malicious payload, execution of the malicious payload, escalation of privilege, lateral movement of threat, and data exfiltration.

Each operation of a kill chain can be accomplished in a variety of manners. For example, to accomplish initial access to inject a malicious payload, a nefarious entity may target users of a network utilizing a variety of techniques (e.g., spear phishing, drive by compromise, etc.). Additionally, to execute the malicious payload, a nefarious entity may utilize varying techniques (e.g., module load, PowerShell, etc.) depending on the operating system and the ways in which the building blocks of the operating system are configured. As it is unlikely that the malicious payload has the security privileges to perform the malicious activities, a nefarious entity may take advantage of vulnerabilities in an operating system and/or applications running in the operating system to elevate the privileges of the malicious payload (e.g., process injection, hooking, etc.). Similarly, it is unlikely that the point (e.g., endpoint) at which initial access to a network was made will be the target for malicious activity. As such, a nefarious entity may utilize various techniques to move the malicious payload to the target endpoint (e.g., local passwords, domain passwords, hash of passwords that are part of Identify and Access Management (IAM), etc.). To access sensitive data, a nefarious entity may utilize many techniques to exfiltrate the data (e.g., custom command and control channels, service keys, etc.). For example, a database and/or other data repository can be configured with a corresponding set of security keys. A domain administrator may have security privileges to access these security keys. As such, after moving the malicious payload to the target endpoint (e.g., a domain administrator), the nefarious entity may execute the malicious payload and utilize one or more security keys to access sensitive data.

While validation services and/or validation databases (e.g., MITRE ATT&CK™ Enterprise) have developed techniques to validate network security infrastructures and/or, more generally, computer security infrastructures based on operating systems, these techniques fail to properly validate network security infrastructures based in the cloud, to report security vulnerabilities, and/or to report potential remediations. For example, while the MITRE ATT&CK™ Enterprise can identify kill chains in endpoints based on the operating system, when one or more endpoints are moved to the cloud, the MITRE ATT&CK™ Enterprise fails to identify kill chains in the network.

For example, an endpoint can be a virtual machine (VM). Virtual machines can be deployed in a variety of manners, such as locally at a facility or deployed virtually in the cloud. When a VM is deployed locally, the VM can access a folder that may include sensitive data. When the VM is moved to and/or deployed in the cloud, access to the folder may be public. In such an example, because the VM is deployed to the cloud in a way that is substantially similar to being deployed locally, traditional validation services and/or validation databases (e.g., MITRE ATT&CK™ Enterprise) cannot identify and detect new kill chains. Additionally, as cloud computing is adopted by network security entities and/or other enterprises, nefarious entities can develop cloud native techniques to exploit security vulnerabilities. Traditional validation services and/or validation databases do not include functionality and/or information regarding cloud native techniques and, thus, fail to identify kill chains in clouds.

Examples disclosed herein additionally or alternatively dynamically adapt to the context of a threat. For example, techniques disclosed herein analyze resource activity for operating-system-based security vulnerabilities and cloud-based security vulnerabilities, apply threat intelligence, machine-learning models, and/or other techniques (e.g., signature-based techniques, content-based techniques, heuristic based techniques, etc.) to identify one or more kill chains, and provide visibility (e.g., remediation actions, data leakage, etc.) associated with the one or more kill chains. To detect operating-system-based security vulnerabilities, examples disclosed herein can utilize end point protection (EPP) techniques and endpoint detection and/or response (EDR) techniques. To detect cloud-based security vulnerabilities, examples disclosed herein can audit and/or otherwise analyze cloud asset configurations to identify and/or evaluate misconfigurations of cloud assets. Additionally or alternatively, configuration logs can be utilized by examples disclosed herein to determine cloud-based security vulnerabilities by auditing and/or otherwise analyzing instance metadata associated with one or more cloud assets.

Additionally or alternatively, examples disclosed herein can detect cloud-based security vulnerabilities by auditing and/or otherwise analyzing cloud application program interface (API) logs. For example, cloud API logs can include information indicative of how nefarious entities can utilize cloud assets to effectuate one or more kill chains and/or otherwise exploit a platform-as-a-service (PaaS). In some examples disclosed herein, cloud-based security vulnerabilities can be detected by auditing and/or otherwise analyzing requests for identification in the network infrastructure and denoting when whitelisted entities in the network request identification.

Examples disclosed herein additionally correlate the operating-system-based security vulnerabilities and cloud-based security vulnerabilities with one or more kill chains to build context around the security vulnerabilities. The context can be processed to identify the one or more kill chains as well as potential remediation actions that a computer security entity can take to reduce the security vulnerabilities. Examples disclosed herein can also generate a report indicating the one or more kill chains and corresponding potential remediation action(s) and can transmit the report to an entity responsible for network security. Examples disclosed herein include methods and apparatus to identify and report cloud-based security vulnerabilities. An example apparatus includes: a security vulnerability detector to, in response to a resource monitor monitoring a threshold amount of resource activity in a resource of a cloud computing environment, determine one or more security vulnerabilities associated with the resource and the cloud computing environment; a vulnerability processor to correlate the one or more security vulnerabilities with one or more kill chains to exploit at least one security vulnerability in the cloud computing environment; and a report generator to generate a report including a story graph, the story graph indicating a subset of at least one of: (a) the one or more security vulnerabilities associated with the one or more kill chains, (b) one or more remediation actions to obviate the one or more security vulnerabilities, or (c) threat intelligence feeds associated with the one or more security vulnerabilities.

FIG. 1 is a block diagram of an example cloud environment 100 including an example cloud 102, an example network 114, an example local endpoint 116, and an example security vulnerability detector 118. The example cloud 102 includes an example first cloud endpoint 104, an example second cloud endpoint 106, an example identity and access management (IAM) device 108, and an example cloud application programming interface (API) 110. The example cloud API 110 includes an example cloud API log 112.

In the example of FIG. 1, the cloud 102 is a distributed computing system that can be utilized to deliver services and/or computational power to one or more clients. For example, the cloud 102 can be implemented by one or more servers in a network. The cloud 102 is communicatively coupled to the network 114 via the cloud API 110. In some examples, the cloud 102 is a public cloud computing environment. In other examples, the cloud 102 is a private cloud computing environment. In additional or alternative examples, the cloud 102 is a hybrid cloud computing environment that includes a combination of public and private cloud computing environments. A cloud provider associated with a client can provide various services including infrastructure-as-a-surface (IaaS), platform-as-a-service (PaaS), and software-as-a-service (SaaS) via the cloud 102. Cloud providers include Amazon Web Services® (AWS®), Microsoft Azure®, Google Cloud Platform™, VMware®, IBM Cloud™, and/or any other suitable cloud provider.

In the example illustrated in FIG. 1, a client utilizing the cloud 102 can configure the cloud computing environment (e.g., the cloud 102) according to a service level agreement (SLA) between the cloud provider and the client. The SLA can specify the objectives that the client wishes be completed by the provider of the cloud 102, the types of services that the cloud 102 is to provide, the responsibilities of the provider of the cloud 102, performance metrics for the cloud 102, and/or other information. Performance metrics can include availability of services, performance benchmarks, provider response time, resolution time, usages statistics, and/or other metrics. The client and/or an employee of the client can set a policy that specifies certain users, endpoints, and/or other devices that are designated as administrators of the services of the cloud 102 and/or certain users, endpoints, and/or other devices that can access services of the cloud 102. The administrators of the services provided by the cloud 102 may have a level of privileges in the cloud 102 that is higher than the level of privileges of ordinary users. Additionally, for each instance of a service implemented by the cloud 102, instance metadata can be generated and stored at the first cloud endpoint 104 and/or the second cloud endpoint 106. The instance metadata can be utilized by an administrator to configure and/or manage an instance of a service. Instance metadata can be accessed when deploying a service and/or during maintenance of a service. The cloud provider and/or client of the cloud 102 may implement a network security infrastructure to protect data and/or other assets utilized in the cloud 102 and/or the network 114. The network security infrastructure may be based on the operating system of one or more of the endpoints in the network 114 and/or the cloud computing environment of the cloud 102.

In the example of FIG. 1, each of the first cloud endpoint 104 and the second cloud endpoint 106 can be implemented by one or more computing devices. For example, each of the first cloud endpoint 104 and the second cloud endpoint 106 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). The first cloud endpoint 104 and the second cloud endpoint 106 are communicatively coupled to the network 114 via the cloud API 110.

In the illustrated example of FIG. 1, each of the first cloud endpoint 104 and the second cloud endpoint 106 can implement a service provided by the cloud 102. In order to facilitate the services implemented at the first cloud endpoint 104 and the second cloud endpoint 106, each of the first cloud endpoint 104 and the second cloud endpoint 106 can communicate with the network 114 via the cloud API 110. For example, one or more of the first cloud endpoint 104 and the second cloud endpoint 106 may execute a call to the cloud API 110 and/or one or more of the first cloud endpoint 104 and the second cloud endpoint 106 may execute an operation in response to a call from the cloud API 110. Each of the first cloud endpoint 104 and the second cloud endpoint 106 may include a respective level of privilege that allows the first cloud endpoint 104 and the second cloud endpoint 106 to carry out functions associated with the service implemented at the first cloud endpoint 104 and the second cloud endpoint 106.

In the example of FIG. 1, the IAM device 108 (e.g., the identification and access management device) can be implemented by one or more computing devices. For example, the IAM device 108 can be one or more analog or digital circuit(s), logic circuits, programmable processor(s), programmable controller(s), GPU(s), DSP(s), ASIC(s), PLD(s) and/or FPLD(s). The IAM device 108 is configured to communicate with the first cloud endpoint 104, the second cloud endpoint 106, the cloud API 110, the local endpoint 116, and/or the security vulnerability detector 118. The IAM device 108 can store one or more privileges associated with users and/or one or more privileges of endpoints in the cloud 102 and/or the network 114. Additionally, the IAM device 108 can handle requests for identification (ID) and/or authorization of one or more users and/or one or more endpoints on the cloud 102 and/or the network 114. The IAM device 108 can additionally or alternatively include one or more whitelists indicative of entities (e.g., users, administrators, endpoints, etc.) that include sufficient privileges to access a given service (e.g., the first cloud endpoint 104, the second cloud endpoint 106, etc.). In examples disclosed herein, the IAM device 108 is independent of the OS of other devices in the network 114.

In the illustrated example of FIG. 1, the cloud API 110 is configured to administrators, users, and/or endpoints to interact and/or otherwise communicate with the network 114. The cloud API 110 facilitates communications between the cloud 102 (e.g., one or more of the first cloud endpoint 104, the second cloud endpoint 106, and the IAM device 108), and the local endpoint 116 and the security vulnerability detector 118. The cloud API 110 can support Hypertext Transfer Protocol (HTTP) and HTTP over Secure Sockets Layer (SSL) (HTTPS) communication protocols. The cloud API 110 can include an authentication mechanism that is supported by the IAM device 108 to allow the cloud API 110 to authorize requests made to the cloud 102. The cloud API 110 can store calls to the cloud API 110 in the cloud API log 112. The data in the cloud API log 112 can indicate the device making a call to the cloud API 110 as well as the requested service and/or action. In some examples, the cloud API 110 can be implemented by one or more analog or digital circuit(s), logic circuits, programmable processor(s), programmable controller(s), GPU(s), DSP(s), ASIC(s), PLD(s) and/or FPLD(s). In some examples, the cloud API log 112 can be implemented by a cache of a CPU, a GPU, a DSP, and/or any other suitable processor. In other examples, the cloud API log 112 can be implemented by random-access memory (RAM), dynamic RAM (DRAM), static RAM (SRAM), and/or any other suitable volatile memory. In additional or alternative examples, the cloud API log 112 can be implemented by flash memory, read-only memory (ROM), programmable ROM (PROM), erasable PROM (EPROM), electrically erasable PROM (EEPROM), and/or any other suitable non-volatile memory.

In the example of FIG. 1, the network 114 is the Internet. In other examples, the network 114 can be implemented by a WAN, a LAN, a WLAN, and/or any other suitable network. The network 114 facilitates communications between the cloud 102, the first cloud endpoint 104, the second cloud endpoint 106, the IAM device 108, the cloud API 110, the local endpoint 116, and the security vulnerability detector 118.

In the example illustrated in FIG. 1, the local endpoint 116 can implement a service provided by the cloud 102. In other examples, the local endpoint 116 can implement a workstation, a personal computer, a tablet computer, a smartphone, a laptop, and/or any other type of computing device. In order to facilitate the services implemented at the local endpoint 116, the local endpoint 116 can communicate with the network 114. For example, the local endpoint 116 may execute a call to the cloud API 110 and/or execute an operation in response to a call from the cloud API 110 and/or a user. The local endpoint 116 may include a respective level of privilege that allows the local endpoint 116 to carry out functions associated with the service implemented at the local endpoint 116.

In the illustrated example of FIG. 1, the security vulnerability detector 118 can be implemented by one or more servers. For example, the security vulnerability detector 118 can be implemented as a datacenter including computing devices, telecommunications systems, storage systems, databases, and/or other computing devices. In other examples, the security vulnerability detector 118 can be implemented by one or more analog or digital circuit(s), logic circuits, programmable processor(s), programmable controller(s), GPU(s), DSP(s), ASIC(s), PLD(s) and/or FPLD(s).

In the example of FIG. 1, the security vulnerability detector 118 is communicatively coupled to the network 114 and is configured to communicate with the cloud 102, the first cloud endpoint 104, the second cloud endpoint 106, the IAM device 108, the cloud API 110, and/or the local endpoint 116. The security vulnerability detector 118 is configured to monitor one or more endpoints and/or one or more users in the network 114, configurations of the cloud 102, the IAM device 108, the cloud API 110, and instance metadata associated with the configuration of the cloud 102. The security vulnerability detector 118 can analyze the operations of one or more users, one or more of the local endpoint 116, the first cloud endpoint 104, the second cloud endpoint 106, the IAM device 108 and/or the cloud API 110, to determine OS-based security vulnerabilities in the network 114 and/or cloud-based security vulnerabilities in the cloud 102 that can be exploited by a nefarious entity to develop one or more kill chains. For example, the security vulnerability detector 118 can monitor assets, configurations, and/or other operations associated with an endpoint, user, and/or other device in the cloud 102 and/or the network 114.

For example, the security vulnerability detector 118 can implement artificial intelligence and/or artificial intelligence models to determine OS-based security vulnerabilities in the network 114 and/or cloud-based security vulnerabilities in the cloud 102. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations. For example, after the model is trained, the model can be deployed in an inference phase. In the inference phase, the model applies patterns and associations learned during training to detect and recognize features in input data. Examples disclosed herein implement AI models to identify one or more kills chains associated with one or more vulnerabilities detected by the security vulnerability detector 118.

In the example of FIG. 1, after the security vulnerability detector 118 and/or a model executing at the security vulnerability detector 118 is deployed, the security vulnerability detector 118 can monitor and/or analyze the operations of one or more users, one or more of the local endpoint 116, the first cloud endpoint 104, the second cloud endpoint 106, the IAM device 108 and/or the cloud API 110 to generate a baseline report corresponding to the network infrastructure of the network 114, the cloud infrastructure of the cloud 102, network communications corresponding to the network 114, and/or cloud communications corresponding to the cloud 102. For example, the security vulnerability detector 118 can monitor and/or analyze the operations of one or more users, one or more of the local endpoint 116, the first cloud endpoint 104, the second cloud endpoint 106, the IAM device 108 and/or the cloud API 110 for a threshold period of time and/or until the security vulnerability detector 118 has processed and/or analyzed a threshold amount of data.

After generating a baseline report, the security vulnerability detector 118 can determine OS-based security vulnerabilities in the network 114 and/or cloud-based security vulnerabilities in the cloud 102 that can be exploited by a nefarious entity to develop one or more kill chains. For example, the security vulnerability detector 118 can utilize managed rule sets (e.g., heuristics) corresponding to the network 114 and/or the cloud 102 as well as one or more deployed models to detect OS-based security vulnerabilities and/or cloud-based security vulnerabilities. The security vulnerability detector 118 can monitor requests to the IAM device 108, the cloud API log 112, communication between the first cloud endpoint 104, the second cloud endpoint 106, the local endpoint 116, a whitelist based on the policy of the cloud 102, and instance metadata associated with one or more services implemented by the cloud 102. Upon identifying a potential vulnerability, the security vulnerability detector 118 can store an indication of the potential vulnerability that can be utilized to generate a story graph to correlate the potential vulnerabilities and identify a kill chain.

In some examples, the security vulnerability detector 118 can generate a story graph for each endpoint, user, and/or other device in the cloud 102 and/or the network 114. For example, the story graph can include activities of the endpoint, user, and/or other device and activities related to the endpoint, user, and/or other device. Activities of an endpoint, user, and/or other device can include various processing operations, file access operations, and/or registry operations of the endpoint, user, and/or other device. Activities related to the endpoint, user, and/or other device can include virtual firewalls (e.g., security groups) to which the endpoint, user, and/or other device is associated, IAM roles (identification and access management roles) assigned to the endpoint, user, and/or other device, the location (e.g., region, availability zone in AWS®, etc.) of the endpoint, user, and/or other device. Additionally or alternatively, activities related to an endpoint, user, and/or other device can include cloud API log audits, network flow logs, and/or domain name system (DNS) logs.

In additional or alternative examples, in response to detecting the one or more security vulnerabilities, the security vulnerability detector 118 can execute the one or more remediation actions to remedy the one or more security vulnerabilities. In such additional or alternative examples, the security vulnerability detector 118 can store an indication of which remediation actions were executed and to which security vulnerabilities the remediation actions correspond. Moreover, the security vulnerability detector 118 can generate and transmit a report to an administrator associated with the cloud 102 and/or a network administrator associated with the network 114 that includes the indication of which remediations actions were executed and to which security vulnerabilities the remediation actions correspond. In such an example, the administrator associated with the cloud 102 and/or the network administrator associated with the network 114 (e.g., a security operations office) can determine whether to roll back the remediation actions (e.g., in the event of a false positive) or to maintain the remediation actions.

Figure 2:
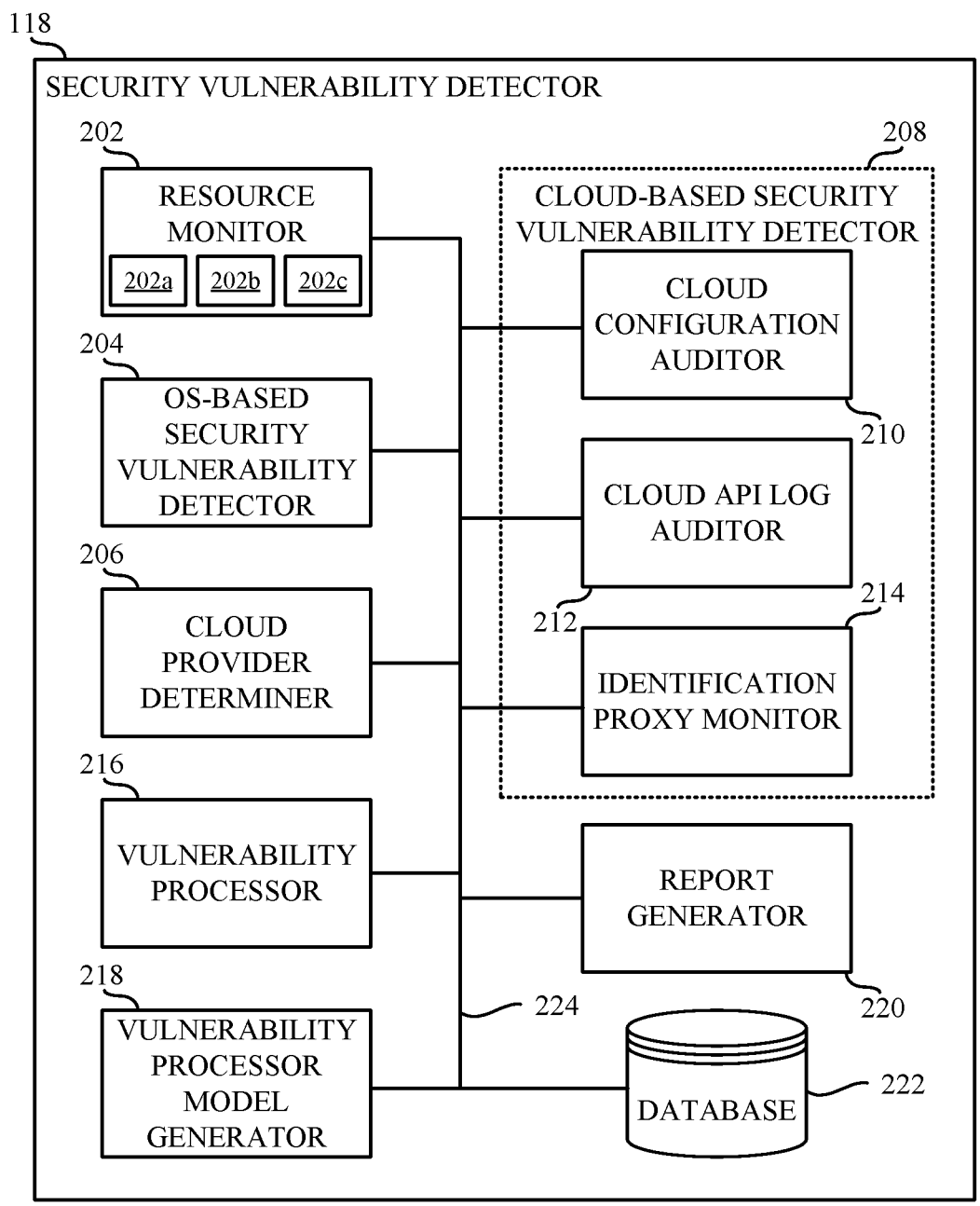
FIG. 2 is a block diagram showing additional detail of the example security vulnerability detector of FIG. 1 that can identify one or more security vulnerabilities of a network.

FIG. 2 is a block diagram showing additional detail of the example security vulnerability detector 118 of FIG. 1 that can identify one or more security vulnerabilities of a network. The example security vulnerability detector 118 includes an example resource monitor 202, an example operating system (OS)-based security vulnerability detector 204, an example cloud provider determiner 206, and an example cloud-based security vulnerability detector 208. The cloud-based security vulnerability detector 208 includes an example cloud configuration auditor 210, an example cloud API log auditor 212, and an example identification proxy monitor 214. The example security vulnerability detector 118 additionally includes an example vulnerability processor 216, an example vulnerability processor model generator 218, an example report generator 220, and an example database 222.

In the example of FIG. 2, the example resource monitor 202 includes an example compute resource monitor 202*a*, an example network resource monitor 202*b*, and an example storage resource monitor 202*c*. In the example of FIG. 2, the compute resource monitor 202*a*, the network resource monitor 202*b*, the example storage resource monitor 202*c*, and/or, more generally, the resource monitor 202 can be implemented by one or more circuits to manage communications between the security vulnerability detector 118 and one or more devices via a network (e.g., the network 114). For example, the resource monitor 202 can monitor resource activity corresponding to a resource of the network 114 and/or a resource of the cloud 102. For example, the resource activity corresponding to a resource of the network 114 and/or a resource of the cloud 102 can include communications including the IAM device 108, communications including the cloud API 110, a policy associated with the cloud 102, instance metadata associated with one or more instances of a service implemented by the cloud 102, and/or other activities of the network 114 and/or the cloud 102. Additionally or alternatively, resource activity corresponding to a resource of the network 114 and/or a resource of the cloud 102 can include compute activity data, network-related activity data and/or storage-related activity data. Example compute activity data includes activities of processors (e.g., central processing units (CPUs), graphics processing units (GPUs), etc.), hardware accelerators, etc. Example network-related activity data includes network communications. Example storage-related activity data includes storage access requests, operations to storage data, etc. In some examples, the resource monitor 202 can be implemented by a network interface controller, a network interface card, a network adapter, and/or any other suitable hardware circuitry.

In examples disclosed herein, a resource of the network 114 and/or a resource of the cloud 102 can include a compute resource, a network resource, and/or a storage resource. Compute resources can include, for example, a CPU, a GPU, a digital signal processor (DSP), a hardware accelerator, one or more cores of a processor, one or more threads of a processor, and/or any other suitable computing instance. Network resources can include, for example, routers, switches, hubs, access points, modems, and/or any suitable networking instance. Storage resources can include, for example, volatile memory, non-volatile memory, double data rate memories, mass storage devices, flash storage devices, optical storage devices, and/or any suitable storage device.

Additionally, the example resource monitor 202 can determine whether a threshold amount of resource activity has been monitored. For example, prior to meeting the threshold amount of resource activity, the security vulnerability detector 118 can operate in an observation mode in which the security vulnerability detector 118 generates a baseline report. The baseline report can indicate expected communications between endpoints, users, and/or other devices and the cloud 102, the first cloud endpoint 104, the second cloud endpoint 106, the IAM device 108, and/or the cloud API 110. The baseline report can additionally include expected configurations for instances metadata, the policy, security privileges of endpoints, users, and/or other devices. The baseline report can be stored at the database 222.

In the illustrated example of FIG. 2, the OS-based security vulnerability detector 204 (e.g., the operating system-based security vulnerability detector) can be implemented by one or more circuits to identify vulnerabilities in the network 114 based on the operating system of one or more devices included in the network 114. For example, the OS-based security vulnerability detector 204 can utilize a validation database (e.g., MITRE ATT&CK™ Enterprise), endpoint detection and response techniques, endpoint protection techniques, signature-based techniques, ML based techniques, content-based techniques, heuristic-based techniques and/or other techniques to identify one or more vulnerabilities and/or one or more kill chains related to the operating system of devices in the network 114. OS-based security vulnerabilities can be related to process creation at the endpoint, file activity at the endpoint, dynamic link library (DLL) load time at the endpoint, and/or information related to executions at the endpoint. The OS-based security vulnerability detector 204 can store the identified OS-based security vulnerabilities at the database 222.

In the example of FIG. 2, the cloud provider determiner 206 can be implemented by one or more circuits that can determine the cloud provider associated with the cloud 102. For example, based on a policy associated with the cloud 102, the cloud provider determiner 206 can determine the cloud provider associated with the cloud 102. For example, the cloud provider can include AWS®, Microsoft Azure®, Google Cloud Platform", VMware®, IBM Cloud™, and/or any other suitable cloud provider. The cloud provider determiner 206 can additionally or alternatively determine the configuration of the cloud 102 based on the policy of the cloud 102. Additionally or alternatively, the example cloud provider determiner 206 can determine whether one or more devices communicatively coupled to the network 114 is integrated in the cloud 102. For example, the cloud provider determiner 206 can determine whether a device is implemented in the cloud 102 by determining whether the device is virtualized. For example, the cloud provider determiner 206 can determine whether a device is implemented in the cloud 102 based on artifacts of the device, such as, the MAC address of the device. In such additional or alternative examples, the cloud provider determiner 206 can determine the cloud provider associated with the cloud 102 based on the configuration of cloud assets.

In some examples, the cloud provider determiner 206 can determine whether a device is implemented in the cloud 102 based on a uniform resource locator (URL) of the device. The example cloud provider determiner 206 can process cloud credentials provided to the security vulnerability detector 118 by a user, an administrator, and/or a computer security entity. In some examples, after the cloud provider determiner 206 identifies the cloud credentials, the cloud provider determiner 206 can enter a discover cycle in which the cloud provider determiner 206 identifies the assets associated with the cloud 102. The example cloud provider determiner 206 can determine a unique identification number and a set of properties associated with a cloud asset. For example, the cloud provider determiner 206 can identify an endpoint (e.g., the first cloud endpoint 104, the second cloud endpoint 106, the local endpoint 116, etc.) based on an instance-ID associated with that endpoint. Additionally or alternatively, the set of properties associated with each cloud asset can include the base image of the cloud asset, the OS of the cloud asset, location information of where the cloud asset is located, an indication of virtual firewalls, if any, associated with the cloud asset, network details associated with the cloud asset (e.g., internet protocol address, media access control address, subnet, boundary information (e.g., virtual private cloud (VPC) in AWS®)), block storage capacity of the cloud asset, RAM capacity of the cloud asset, the number of virtual CPUs assigned to the cloud asset, and/or other information related to the cloud asset. Based on the unique identification number and the set of properties associated with a cloud asset, the example cloud provider determiner 206 can determine the cloud provider of the cloud 102. Additionally or alternatively, the cloud provider determiner 206 can store the unique identification number and/or the set of properties associated with a cloud asset in the database 222.

In the example of FIG. 2, the example cloud-based security vulnerability detector 208 can be implemented by one or more circuits to determine cloud-based security vulnerabilities. The example cloud-based security vulnerability detector 208 includes the example cloud configuration auditor 210, the example cloud API log auditor 212, and the example identification proxy monitor 214. As such, the example cloud-based security vulnerability detector 208 can evaluate the configuration of the cloud 102, can monitor the cloud API log 112, and can monitor the IAM device 108 for potential vulnerabilities and in response to detecting cloud-based vulnerabilities, can store indications of cloud-based vulnerabilities at the database 222.

In the example of FIG. 2, the cloud configuration auditor 210 can be implemented by one or more circuits to audit the configuration of the cloud 102 to determine potential vulnerabilities of the configuration. The example cloud configuration auditor 210 can evaluate a policy associated with the cloud 102 to identify potential vulnerabilities in the configuration of the cloud 102. For example, a potential vulnerability in a configuration of the cloud 102 can include a device in a security group of the cloud 102 that lacks a common characteristic that other devices in the security group include, a configuration that allows non-administrators to access services and/or change service related parameters to which typically only administrators have access. If the example cloud configuration auditor 210 detects a potential vulnerability in the configuration of the cloud 102, the cloud configuration auditor 210 can store an indication of the potential vulnerability at the database 222. The indication of the potential vulnerability can include the parameter of the configuration that causes the potential vulnerability, the potential vulnerability flowing from the configuration parameter, and/or other information related to the potential vulnerability.

In some examples, the cloud configuration auditor 210 can monitor the instance metadata associated with one or more services (e.g., the first cloud endpoint 104, the second cloud endpoint 106, etc.). To detect changes to instance metadata, the example cloud configuration auditor 210 can monitor a configuration log associated with the cloud 102. If the example cloud configuration auditor 210 detects a change to the instance metadata outside of a designated deployment and/or maintenance period, the cloud configuration auditor 210 can identify the change to the instance metadata as a potential vulnerability. The example cloud configuration auditor 210 can store indications of changes to instance metadata at the database 222. The indication of changes to instance metadata can include the change to the instance metadata, the device that changed the instance metadata, and/or other information related to the change of instance metadata.

In the example of FIG. 2, the cloud API log auditor 212 can be implemented by one or more circuits to audit the cloud API log 112 to determine potential vulnerabilities associated with calls to the cloud API 110. For example, based on the baseline report, the cloud API log auditor 212 can identify expected calls to the cloud API 110 from each of the first cloud endpoint 104, the second cloud endpoint 106, the local endpoint 116, and/or other devices and/or endpoints in the cloud 102 and/or the network 114. After the baseline report is established, the example cloud API log auditor 212 can access the cloud API log 112 to identify calls to the cloud API 110 from the first cloud endpoint 104, the second cloud endpoint 106, the local endpoint 116, and/or other devices and/or endpoints in the cloud 102 and/or the network 114 that deviate from the baseline report. If the example cloud API log auditor 212 identifies a call to the cloud API 110 that deviates from the baseline report, the cloud API log auditor 212 can identify the call as a potential vulnerability and store an indication of the potential vulnerability at the database 222. The indication of the potential vulnerability can include the device that made the call to the cloud API 110, the contents of the call, and whether the cloud API 110 executed the call to the cloud API 110.

In the example of FIG. 2, the identification proxy monitor 214 can be implemented by one or more circuits to monitor IAM requests to the IAM device 108. For example, the identification proxy monitor 214 can establish one or more rule sets based on the policy of the cloud 102 as configured by a client and/or administrator. For example, if a rule set specifies that the first cloud endpoint 104 is configured to communicate with the local endpoint 116, but the first cloud endpoint 104 requests authorization and/or a token to access the second cloud endpoint 106, the identification proxy monitor 214 can indicate this action as a potential vulnerability.

In some examples, the identification proxy monitor 214 can analyze the policy of the cloud 102 as set by a client corresponding to the cloud 102. Based on the policy of the cloud 102, the identification proxy monitor 214 can develop a whitelist of which entities (e.g., administrators, users, endpoints, etc.) can access which services (IaaS, PaaS, the first cloud endpoint 104, the second cloud endpoint 106, the local endpoint 116, etc.). If the example identification proxy monitor 214 detects that an entity has accessed a service that is not designated in the whitelist, the identification proxy monitor 214 can identify this as a potential vulnerability. The example identification proxy monitor 214 can store an indication of the potential vulnerability at the database 222. The indication of the potential vulnerability can include the entity that violated the whitelist, the service the entity accessed in violation of the whitelist, the operations executed in response to the violation of the whitelist, and/or other information associated with the violation of the whitelist.

In the example illustrated in FIG. 2, the vulnerability processor 216 can be implemented by one or more circuits to correlate one or more indications of a potential vulnerability to develop one or more kill chains. For example, the vulnerability processor 216 can implement one or more artificial intelligence models to identify one or more kill chains based on potential vulnerabilities detected by the OS-based security vulnerability detector 204 and the cloud-based security vulnerability detector 208. The example vulnerability processor 216 can generate a story graph including operations at an entity and operations related to the entity. For example, the vulnerability processor 216 can generate a story graph to correlate the one or more potential vulnerabilities. For example, the vulnerability processor 216 can map one or more potential vulnerabilities to one or more additional potential vulnerabilities to track addresses (e.g., Internet protocol (IP) addresses, media access control (MAC) addresses, etc.) at which a file is accessed, executed, and/or otherwise operated upon and/or operations and/or entities associated with the file.

In a cloud based on AWS® (e.g., the cloud 102), the story graph can include EC2 instances, IAM roles, S3 storage, user metadata, and a database. The example vulnerability processor 216 can additionally or alternatively identify one or more remediation actions to obviate the potential vulnerabilities. In some examples, the vulnerability processor 216 can execute the remediation actions without user input and store an indication of the action taken to remediate the potential vulnerabilities at the database 222. In response to a notification from a client to roll back the remediation action, the example vulnerability processor 216 can rollback and/or otherwise remove the remediation action (e.g., in the event of a false positive). In some examples, the vulnerability processor 216 can implement one or more artificial intelligence models to facilitate the aforementioned functionality. In some examples, based on the cloud provider of the cloud 102, the vulnerability processor 216 can evaluate the one or more identified potential vulnerabilities based on known attack techniques (e.g., kill chains) for the identified cloud provider.

In the illustrated example of FIG. 2, the vulnerability processor model generator 218 can be implemented by one or more circuits to generate and/or train one or more artificial intelligence models to correlate one or more OS-based potential vulnerabilities and/or one or more cloud-based potential vulnerabilities. For example, the vulnerability processor model generator 218 can generate and/or train an AI model for each network and/or cloud environment monitored by the security vulnerability detector 118 as will be discussed below in connection with FIG. 3.

In the example illustrated in FIG. 2, the report generator 220 can be implemented by one or more circuits to generate and/or transmit reports to clients and/or network security entities (e.g., SOCs, IT departments, etc.) associated with one or more potential vulnerabilities and/or one or more kill chains. For example, the report generator 220 can generate a report including one or more story graphs indicative of the activity at a suspected device and/or activity related to the suspected device. The report generated by the example report generator 220 can additionally or alternatively include the potential vulnerabilities detected by the example OS-based security vulnerability detector 204 and the example cloud-based security vulnerability detector 208, threat intelligence feeds associated with the potential vulnerabilities. In additional or alternative examples, the report generator 220 can include the one or more remediation actions identified by the vulnerability processor 216 and/or one or more remediation actions that were executed by the vulnerability processor 216 to obviate the potential vulnerabilities. In some examples, the report can include the options to rollback and/or otherwise remove the remediation actions taken by the vulnerability processor 216. Remediation actions can include quarantining a suspected device, removing security privileges of the suspected device, locking the suspected device, and/or any other suitable remediation action.

In the example of FIG. 2, the database 222 is memory. The example database 222 can include the baseline report, one or more indications of OS-based security vulnerabilities, one or more indications of potential vulnerabilities in the configuration of the cloud 102, one or more indications of changes to instance metadata, one or more indications of potential vulnerabilities in calls to the cloud API 110, one or more indications of potential vulnerabilities in requests to the IAM device 108, one or more indications of remediation actions that can be taken to remediate the potential vulnerabilities, one or more indications of remediation actions taken to remediate the potential vulnerabilities, one or more trained models, and/or other information related to potential vulnerabilities detected by the security vulnerability detector 118.

In the illustrated example of FIG. 2, the database 222 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 222 may additionally or alternatively be implemented by one or more double data rate (DDR) memories, such as DDR, DDR2, DDR3, DDR4, mobile DDR (mDDR), etc. The example database 222 may additionally or alternatively be implemented by one or more mass storage devices such as hard disk drive(s), compact disk drive(s), digital versatile disk drive(s), solid-state disk drive(s), etc. While in the illustrated example the database 222 is illustrated as a single database, the database 222 may be implemented by any number and/or type(s) of databases. Furthermore, the data stored at the database 222 may be in any data format such as, for example, binary data, comma delimited data, tab delimited data, structured query language (SQL) structures, etc. In FIG. 2, the example database 222 is an organized collection of data, stored on a computational system that is electronically accessible. For example, the database 222 may be stored on a server, a desktop computer, an HDD, an SSD, or any other suitable computing system.

In examples disclosed herein, each of the resource monitor 202, the OS-based security vulnerability detector 204, the cloud provider determiner 206, the cloud-based security vulnerability detector 208, the cloud configuration auditor 210, the cloud API log auditor 212, the identification proxy monitor 214, the vulnerability processor 216, the report generator 220, the vulnerability processor model generator 218, the report generator 220, and the database 222 is in communication with the other elements of the security vulnerability detector 118. For example, the resource monitor 202, the OS-based security vulnerability detector 204, the cloud provider determiner 206, the cloud-based security vulnerability detector 208, the cloud configuration auditor 210, the cloud API log auditor 212, the identification proxy monitor 214, the vulnerability processor 216, the report generator 220, the vulnerability processor model generator 218, the report generator 220, and the database 222 are in communication via an example communication bus 224.

In some examples disclosed herein, the resource monitor 202, the OS-based security vulnerability detector 204, the cloud provider determiner 206, the cloud-based security vulnerability detector 208, the cloud configuration auditor 210, the cloud API log auditor 212, the identification proxy monitor 214, the vulnerability processor 216, the report generator 220, the vulnerability processor model generator 218, the report generator 220, and the database 222 may be in communication via any suitable wired and/or wireless communication system. Additionally, in some examples disclosed herein, each of the resource monitor 202, the OS-based security vulnerability detector 204, the cloud provider determiner 206, the cloud-based security vulnerability detector 208, the cloud configuration auditor 210, the cloud API log auditor 212, the identification proxy monitor 214, the vulnerability processor 216, the report generator 220, the vulnerability processor model generator 218, the report generator 220, and the database 222 may be in communication with any component exterior to the security vulnerability detector 118 via any suitable wired and/or wireless communication system.

Figure 3:
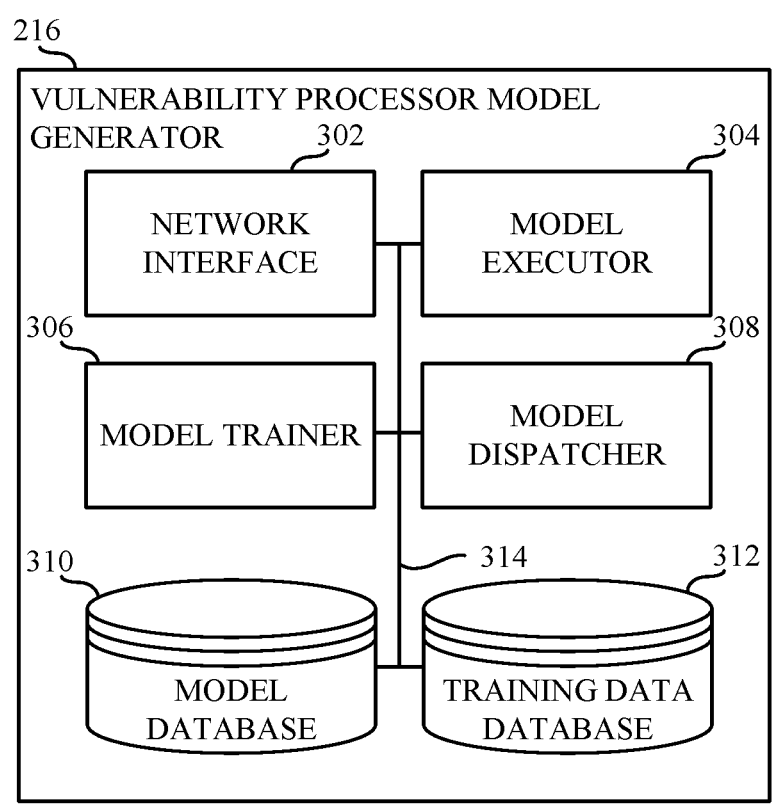
FIG. 3 is a block diagram showing additional detail of the example vulnerability processor model generator of FIG. 2 that can train one or more artificial intelligence models to identify cloud-based security vulnerabilities.

FIG. 3 is a block diagram showing additional detail of the example vulnerability processor model generator 218 of FIG. 2 that can train one or more artificial intelligence models to identify cloud-based security vulnerabilities. The vulnerability processor model generator 218 includes an example network interface 302, an example model executor 304, an example model trainer 306, an example model dispatcher 308, an example model database 310, and an example training data database 312.

In the example of FIG. 3, the network interface 302 can be implemented by one or more circuits. The example network interface 302 is configured to obtain training data including OS-based security vulnerabilities and/or cloud-based security vulnerabilities. Additionally or alternatively, the example network interface 302 can store the training data in the training data database 312. The training data can additionally or alternatively include additional data related to a network infrastructure and/or cloud infrastructure, such as the policy of the cloud, the configuration of the cloud, a whitelist, a baseline report, security privileges, and/or any suitable data that can be utilized to determine potential vulnerabilities.

In the illustrated example of FIG. 3, the model executor 304 can be implemented by one or more circuits to execute an AI model to correlate one or more potential vulnerabilities and generate one or more kill chains. The example model executor 304 is configured to execute the AI model and provide one or more kills chains, one or more story graphs, and/or additional information to the model trainer 306.

In the example of FIG. 3, the model trainer 306 can be implemented by one or more circuits to update and/or otherwise validate the AI model. The model trainer 306 can train the AI model via supervised training utilizing a training data set including known kill chains. The example model trainer 306 can train the model in an iterative approach by training the model until the model performs to a desired threshold (e.g., with an accuracy of 95%) of training data. If the model performs below the desired threshold, the example model trainer 306 can update weights associated with the model based on the result of the comparison with the error threshold. Additionally or alternatively, the example model trainer 306 can determine whether to retrain the model. For example, if new training data is received and/or if a training entity (e.g., administrator, controller, etc.) determines that a threshold period time has passed without training the model, the model trainer 306 can retrain the model.

In the illustrated example of FIG. 3, the model dispatcher 308 can be implemented by one or more circuits to dispatch trained models to one or more computing devices. For example, the model dispatcher 308 can dispatch the trained model to the vulnerability processor 216. In additional or alternative examples, the model dispatcher 308 can dispatch the trained model to the model database 310.

In the example illustrated in FIG. 3, the model database 310 is memory. The example model database 310 is configured to store the model generated by the model executor 304. In some examples disclosed herein, the model database 310 may be configured to store the model in a cloud environment. Alternatively, the example model database 310 may be configured to store the model in a remote and/or local datacenter and/or any location.

The example model database 310 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example model database 310 may additionally or alternatively be implemented by one or more double data rate (DDR) memories, such as DDR, DDR2, DDR3, DDR4, mobile DDR (mDDR), etc. The example model database 310 may additionally or alternatively be implemented by one or more mass storage devices such as hard disk drive(s), compact disk drive(s), digital versatile disk drive(s), solid-state disk drive(s), etc. While in the illustrated example the model database 310 is illustrated as a single database, the model database 310 may be implemented by any number and/or type(s) of databases. Furthermore, the data stored at the example model database 310 may be in any data format such as, for example, binary data, comma delimited data, tab delimited data, structured query language (SQL) structures, etc. In FIG. 3, the example model database 310 is an organized collection of data stored on a computational system that is electronically accessible. For example, the model database 310 may be stored on a server, a desktop computer, an HDD, an SSD, or any other suitable computing system.

In the example of FIG. 3, the training data database 312 is memory. The example training data database 312 is configured to store the training data provided to the model executor 304. In some examples disclosed herein, the training data database 312 may be configured to store the training data in a cloud environment. Alternatively, the training data database 312 may be configured to store the training data in a remote and/or local datacenter and/or any location.

The example training data database 312 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example training data database 312 may additionally or alternatively be implemented by one or more double data rate (DDR) memories, such as DDR, DDR2, DDR3, DDR4, mobile DDR (mDDR), etc. The example training data database 312 may additionally or alternatively be implemented by one or more mass storage devices such as hard disk drive(s), compact disk drive(s), digital versatile disk drive(s), solid-state disk drive(s), etc. While in the illustrated example the training data database 312 is illustrated as a single database, the training data database 312 may be implemented by any number and/or type(s) of databases. Furthermore, the data stored at the example training data database 312 may be in any data format such as, for example, binary data, comma delimited data, tab delimited data, structured query language (SQL) structures, etc. In FIG. 3, the example training data database 312 is an organized collection of data, stored on a computational system that is electronically accessible. For example, the training data database 312 may be stored on a server, a desktop computer, an HDD, an SSD, or any other suitable computing system.

In examples disclosed herein, each of the network interface 302, the model executor 304, the model trainer 306, the model dispatcher 308, the model database 310, and the training data database 312 is in communication with the other elements of the vulnerability processor model generator 218. For example, the network interface 302, the model executor 304, the model trainer 306, the model dispatcher 308, the model database 310, and the training data database 312 are in communication via an example communication bus 314.

In some examples disclosed herein, the network interface 302, the model executor 304, the model trainer 306, the model dispatcher 308, the model database 310, and the training data database 312 may be in communication via any suitable wired and/or wireless communication system. Additionally, in some examples disclosed herein, each of the network interface 302, the model executor 304, the model trainer 306, the model dispatcher 308, the model database 310, and the training data database 312 may be in communication with any component exterior to the vulnerability processor model generator 218 via any suitable wired and/or wireless communication system.

Figure 4:
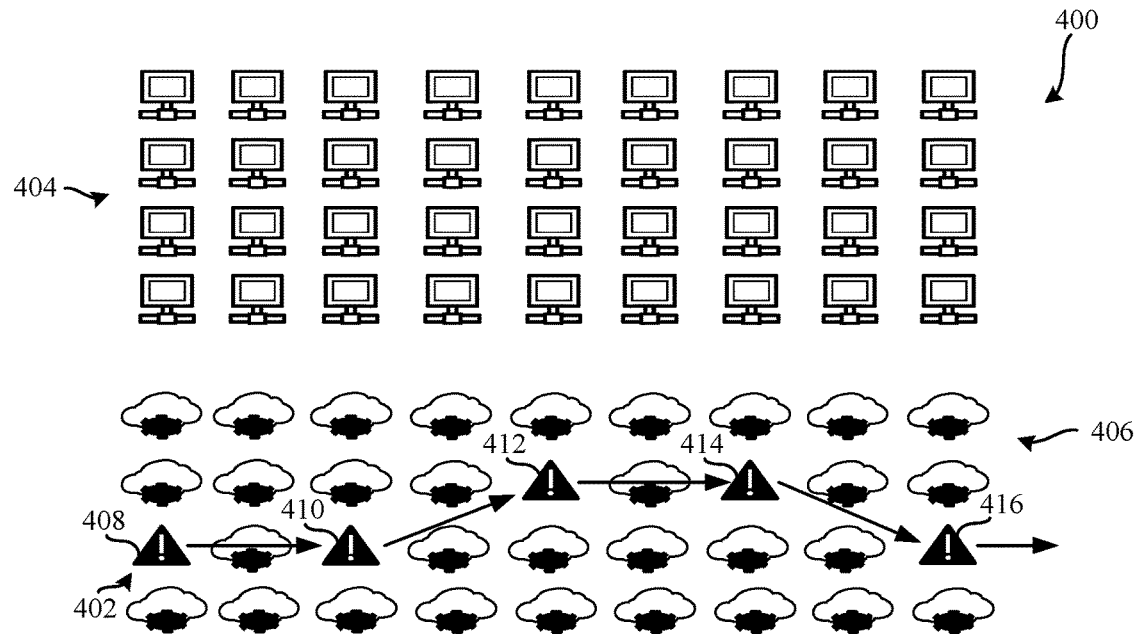
FIG. 4 is a block diagram of an example cloud environment including a kill chain representative of operations to exploit a security vulnerability in the cloud environment.

FIG. 4 is a block diagram of an example cloud environment 400 including an example kill chain 402 representative of operations to exploit a security vulnerability in the cloud environment 400. The example cloud environment 400 includes the example kill chain 402, example physical assets 404, and example cloud assets 406. The example kill chain 402 includes an example first operation 408, an example second operation 410, an example third operation 412, an example fourth operation 414, and an example fifth operation 416.

In the example of FIG. 4, the physical assets 404 can be implemented by one or more servers. For example, the physical assets 404 can be one or more server racks operating at a datacenter. The example physical assets 404 can be virtualized and abstracted so that one or more services provided by a cloud provider can be executed at the physical assets 404. In some examples, the cloud environment 400 can correspond to the cloud 102 of FIG. 1.

In the example illustrated in FIG. 4, the cloud assets 406 can be implemented by one or more VMs, one or more services (e.g., IaaS, SaaS, PaaS, etc.), and/or other virtual assets. As such, the example cloud assets 406 can be executed at the physical assets 404 to execute the services and/or facilitate operations of the cloud assets 406.

In the illustrated example of FIG. 4, the kill chain 402 is representative of operations to exploit a security vulnerability in the cloud environment 400. In the example of FIG. 4, the kill chain 402 includes five stages. During the first operation 408, a nefarious entity can obtain initial access to the cloud environment 400. For example, the first operation 408 can correspond to an exploitation of misconfigured storage implemented by the cloud assets 406 (e.g., a spear phishing attempt, accessing the cloud environment 400 via a misconfigured connection to GitHub®, a server-side request forgery (SSRF) operation). For example, a nefarious entity may obtain cloud credentials via the first operation 408. By auditing the configuration of the cloud environment 400, the example cloud configuration auditor 210 can identify the first operation 408 as a potential vulnerability.

In the example of FIG. 4, during the second operation 410, the nefarious entity can execute a malicious payload. For example, during the second operation 410, a nefarious entity can execute a payload utilizing an API of the cloud environment 400 (e.g., the cloud API 110). By auditing the cloud API log (e.g., the cloud API log 112) of the cloud environment 400, the cloud API log auditor 212 can identify the second operation 410 as a potential vulnerability.

In the illustrated example of FIG. 4, during the third operation 412, the nefarious entity can exploit the IAM role of a service and/or asset of the cloud assets 406 to escalate the privileges of the nefarious entity within the cloud environment 400. For example, if the nefarious entity gains initial access to a server (e.g., one of the physical assets 404) implementing the DevOps service (e.g., one of the cloud assets 406), the DevOps service can include various privileges specified by the IAM role of the DevOps service (e.g., as specified by the IAM device 108). The nefarious entity can exploit the privileges of the DevOps service to access other services in the cloud environment 400 and escalate the privileges of the nefarious entity. By monitoring the IAM role of the DevOps service (e.g., monitoring the IAM device 108), the example identification proxy monitor 214 can identify the third operation 412 as a potential vulnerability.

In the example of FIG. 4, during the fourth operation 414, the nefarious entity can manipulate and/or otherwise adjust the instance metadata of a service instance hosting the nefarious entity. For example, the nefarious entity can implement a malicious script in the instance metadata to achieve a lateral movement to one or more of the cloud assets 406 that may be a target of the nefarious entity. By monitoring the cloud configuration log of the cloud environment 400, the example cloud configuration auditor 210 can identify the fourth operation 414 as a potential vulnerability.

In the example illustrated in FIG. 4, once the nefarious entity has reached one of the cloud assets 406 that can access the target of the nefarious entity (e.g., one of the cloud assets 406 including sufficient privileges to access the target), the nefarious entity may execute the fifth operation 416. During the fifth operation 416, the nefarious entity can call the cloud API (e.g., the cloud API 110) to exfiltrate data from a cloud asset such as, a database (e.g., PaaS). By auditing the cloud API log (e.g., the cloud API log 112) of the cloud environment 400, the example cloud API log auditor 212 can identify the fifth operation 416 as a potential vulnerability.

In the example of FIG. 4, based on the identification of at least one of the first operation 408, the second operation 410, the third operation 412, the fourth operation 414, and/or the fifth operation 416 as a potential vulnerability, the vulnerability processor 216 can correlate any of the first operation 408, the second operation 410, the third operation 412, the fourth operation 414, and/or the fifth operation 416 as the kill chain 402. Upon identifying the kill chain 402, the example vulnerability processor 216 can execute one or more remediation actions to obviate the vulnerabilities and stop the kill chain 402, and/or the example report generator 220 can transmit one or more remediation actions to a user and/or a computer security entity to allow the user and/or the computer security entity to evaluate and/or stop the kill chain 402. For example, a user and/or a computer security entity can select one or more of the one or more remediation actions, and in response to the selection, the vulnerability processor 216 can execute the remediation action to obviate the potential vulnerabilities and/or stop the kill chain 402.

Figure 5:
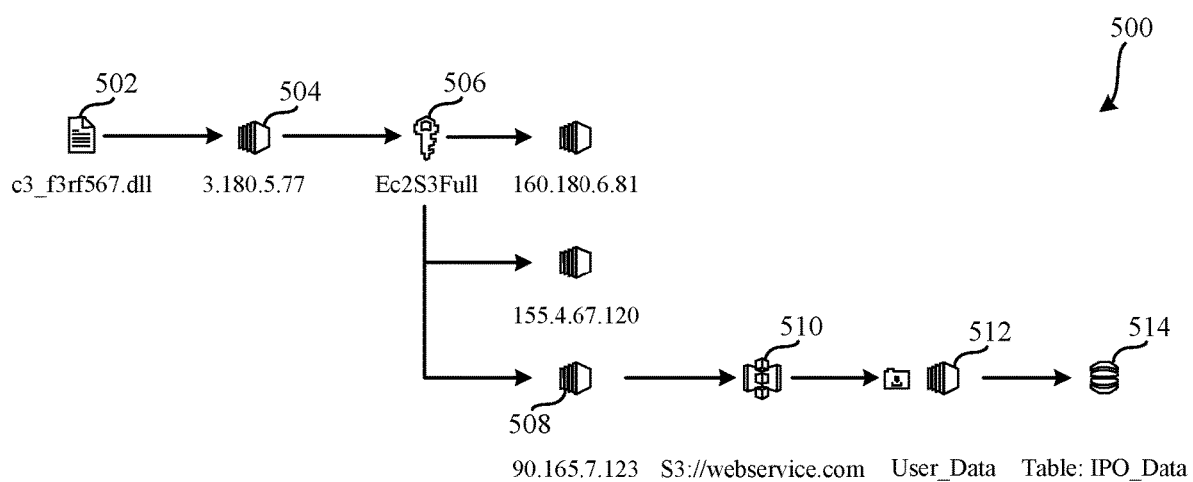
FIG. 5 is a workflow diagram of an example story graph that can be generated by the vulnerability processor of FIG. 2.

FIG. 5 is a workflow diagram of an example story graph 500 that can be generated by the vulnerability processor 216 of FIG. 2. The example story graph 500 is representative of a story graph generated based on an AWS® cloud. In some examples, the story graph 500 can correspond to the kill chain 402 of FIG. 4. The example story graph 500 includes an example first operation 502, an example second operation 504, an example third operation 506, an example fourth operation 508, an example fifth operation 510, an example sixth operation 512, and an example seventh operation 514.

The example first operation 502 is associated with a file ("c3_f3rf567.dll"). The example first operation 502 can correspond to a nefarious entity accessing a DLL including the file. For example, a nefarious entity could gain access to the AWS® cloud via the first operation 502. The example second operation 504 corresponds to accessing a cloud asset including an IP address of 3.180.5.77. In the example second operation 504, the cloud asset may include privileges for EC2 and S3 services. The example second operation 504 may represent a lateral movement by a nefarious entity to a cloud asset including sufficient security privileges.

The example third operation 506 is associated with executing security privileges of the cloud asset of the second operation 504. For example, a nefarious entity may utilize the security privileges (Ec2S3Full) of the cloud asset including an IP address of 3.180.5.77 to access other cloud assets. By executing the example third operation 506, the nefarious entity gains access to cloud assets including IP addresses of 160.180.6.81, 155.67.120, and 90.165.7.123.

The example fourth operation 508 is associated with utilizing the privileges of the cloud asset including an IP address of 90.165.7.123 to access S3 object storage services (S3://webservice.com). The example fifth operation 510 can correspond to accessing the S3 object storage service to gain access to user data (User_Data). The example sixth operation 512 can correspond to a nefarious entity utilizing the user data to obtain one or more credentials that can be utilized to access a database (Table: IPO_Data). The seventh operation 514 can correspond to the nefarious entity utilizing the one or more credentials to obtain data from the database (Table: IPO_Data).

Examples disclosed herein monitor the cloud API, IAM device, cloud configuration logs, policy of the AWS® cloud, and configuration of the AWS® cloud to determine vulnerabilities in the AWS® cloud. Examples disclosed herein may detect and/or stop the actions of a nefarious entity prior to the seventh operation 514. The example story graph 500 may be generated and/or transmitted to a user and/or computer security entity to allow the user and/or computer security entity to obtain a wholistic viewpoint of the network security attack. The example story graph 500 can additionally illustrate actions that can be taken to prevent and/or otherwise stop the attack. In response to a selection of one of the actions, examples disclosed herein can execute the actions to stop and/or otherwise prevent the attack. While the example story graph 500 of FIG. 5 is illustrated in connection with an AWS® cloud environment, AWS® is merely an example cloud service provider and a similar environment may be implemented with any other cloud service provider.

While example manners of implementing the security vulnerability detector 118 of FIG. 1 and the example vulnerability processor model generator 218 of FIG. 2 are illustrated in FIGS. 2 and 3, respectively, one or more of the elements, processes and/or devices illustrated in FIGS. 2 and 3 may be combined, divided, re-arranged, omitted, eliminated and/or implemented in any other way. Further, the example resource monitor 202, the example OS-based security vulnerability detector 204, the example cloud provider determiner 206, the example cloud-based security vulnerability detector 208, the example cloud configuration auditor 210, the example cloud API log auditor 212, the example identification proxy monitor 214, the example vulnerability processor 216, the example vulnerability processor model generator 218, the example report generator 220, the example database 222 and/or, more generally, the example security vulnerability detector 118 of FIG. 1 and/or the example network interface 302, the example model executor 304, the example model trainer 306, the example model dispatcher 308, the example model database 310, the example training data database 312, and/or, more generally, the example vulnerability processor model generator 218 of FIG. 2 may be implemented by hardware, software, firmware and/or any combination of hardware, software and/or firmware. Thus, for example, any of the example resource monitor 202, the example OS-based security vulnerability detector 204, the example cloud provider determiner 206, the example cloud-based security vulnerability detector 208, the example cloud configuration auditor 210, the example cloud API log auditor 212, the example identification proxy monitor 214, the example vulnerability processor 216, the example vulnerability processor model generator 218, the example report generator 220, the example database 222 and/or, more generally, the example security vulnerability detector 118 of FIG. 1 and/or the example network interface 302, the example model executor 304, the example model trainer 306, the example model dispatcher 308, the example model database 310, the example training data database 312, and/or, more generally, the example vulnerability processor model generator 218 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example resource monitor 202, the example OS-based security vulnerability detector 204, the example cloud provider determiner 206, the example cloud-based security vulnerability detector 208, the example cloud configuration auditor 210, the example cloud API log auditor 212, the example identification proxy monitor 214, the example vulnerability processor 216, the example vulnerability processor model generator 218, the example report generator 220, the example database 222 and/or, more generally, the example security vulnerability detector 118 of FIG. 1 and/or the example network interface 302, the example model executor 304, the example model trainer 306, the example model dispatcher 308, the example model database 310, the example training data database 312, and/or, more generally, the example vulnerability processor model generator 218 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example security vulnerability detector 118 of FIG. 1 and/or the example vulnerability processor model generator 218 may include one or more elements, processes and/or devices in addition to, or instead of, those illustrated in FIGS. 2 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the security vulnerability detector 118 implements means for detecting a security vulnerability. In some examples, the resource monitor 202 implements example means for monitoring a resource. In some examples, the compute resource monitor 202a implements example means for monitoring a compute resource. In some examples, the network resource monitor 202b implements example means for monitoring a network resource. In some examples, the storage resource monitor 202c implements example means for monitoring a storage resource. In some examples, the OS-based security vulnerability detector 204 implements example means for detecting an operating system-based security vulnerability. In some examples, the cloud provider determiner 206 implements example means for determining cloud providers. In some examples, the cloud-based security vulnerability detector 208 implements example means for determining cloud-based security vulnerabilities. In some examples, the cloud configuration auditor 210 implements example means for auditing cloud configurations. In some examples, the cloud API log auditor 212 implements example means for auditing cloud API logs. In some examples, the identification proxy monitor 214 implements example means for monitoring an identification. In some examples, the vulnerability processor 216 implements example means for processing a vulnerability. In some examples, the vulnerability processor model generator 218 implements example means for generating a model. In some examples, the report generator 220 implements example means for generating reports. In some examples, the database 222 implements means for storing vulnerability monitoring data.

In some examples, the network interface 302 implements example means for interfacing. In some examples, the model executor 304 implements example means for executing. In some examples, the model trainer 306 implements example means for training. In some examples, the model dispatcher 308 implements means for dispatching. In some examples, the model database 310 implements means for storing models. In some examples, the training data database 312 implements means for storing data.

Figure 6:
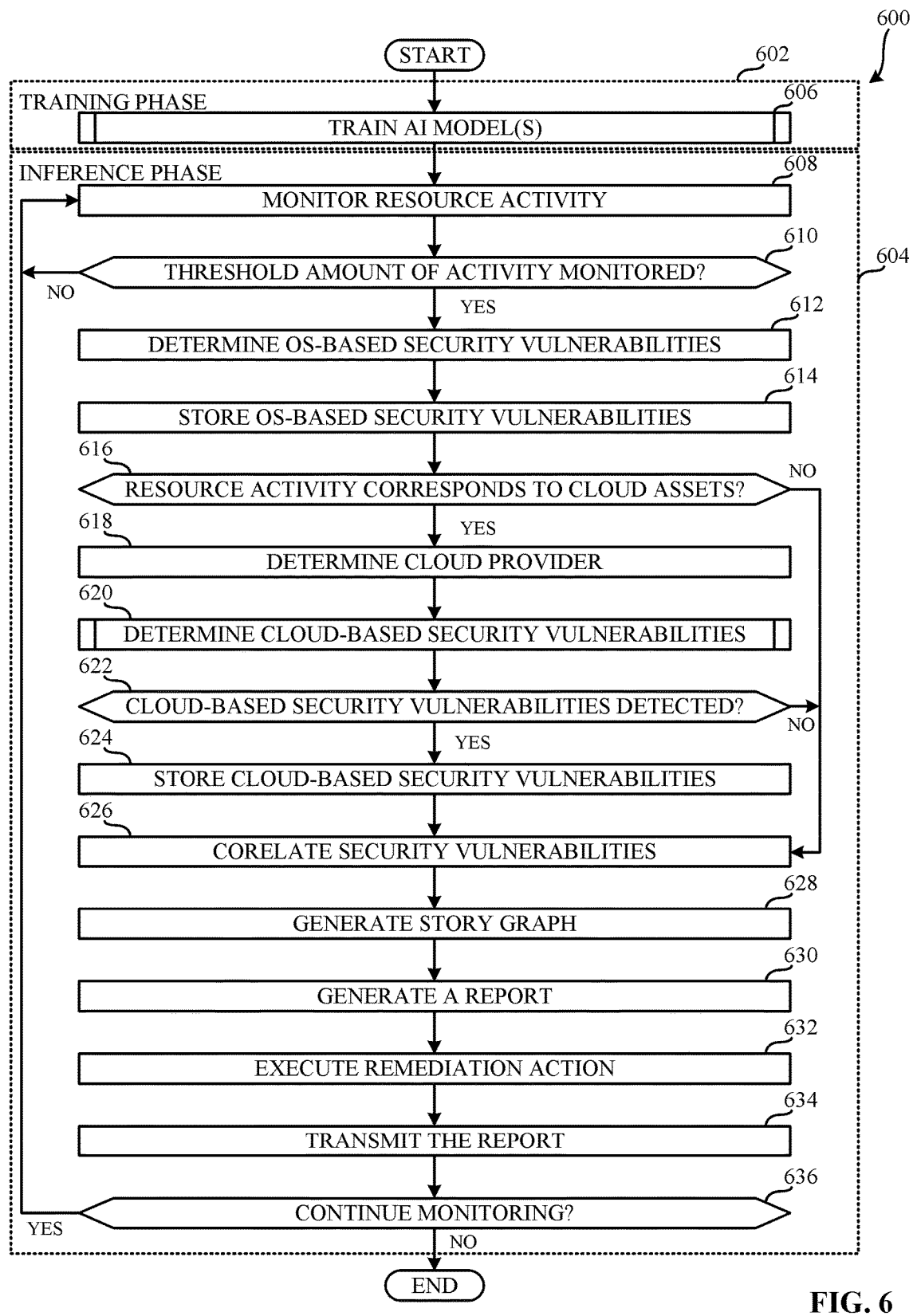
FIG. 6 is a flowchart representative of example machine readable instructions, which may be executed to implement the example security vulnerability detector of FIGS. 1 and 2 to identify one or more security vulnerabilities of a network.
Figure 7:
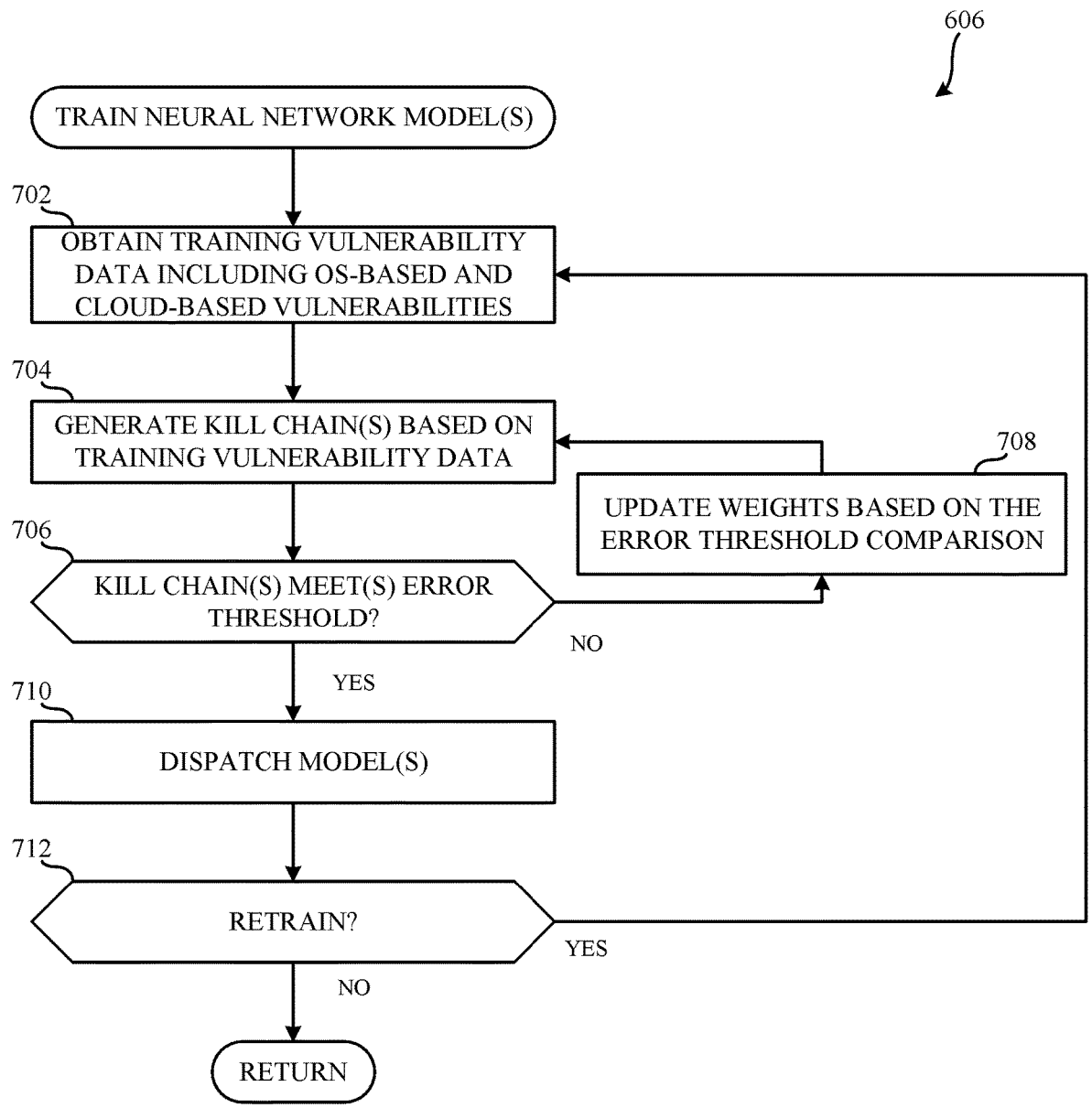
FIG. 7 is a flowchart representative of example machine readable instructions, which may be executed to implement the example security vulnerability detector of FIGS. 1 and 2 to train one or more artificial intelligence models to identify cloud-based security vulnerabilities.
Figure 8:
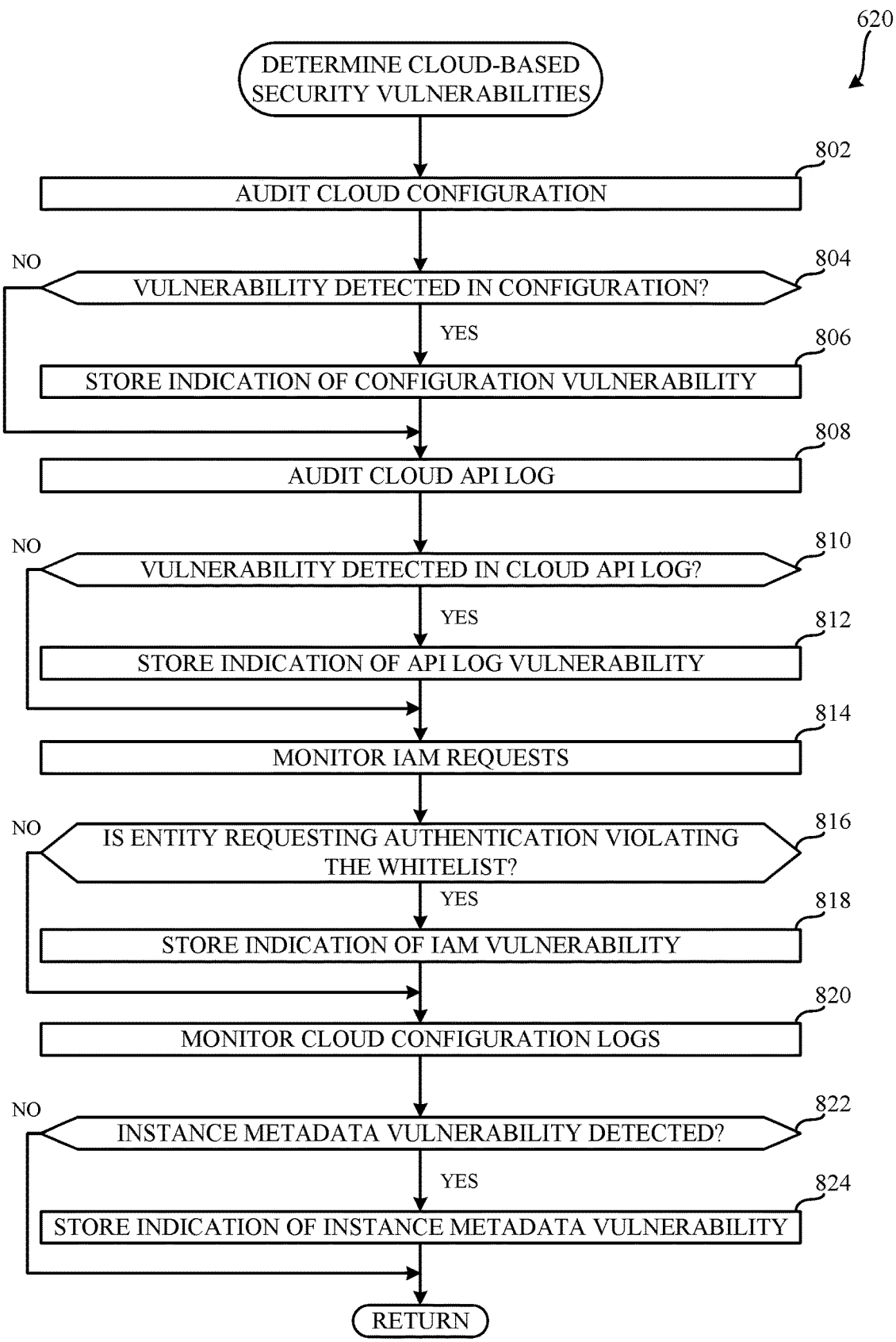
FIG. 8 is a flowchart representative of example machine readable instructions, which may be executed to implement the example security vulnerability detector of FIGS. 1 and 2 to determine cloud-based security vulnerabilities.

Flowcharts representative of example hardware logic, machine readable instructions, hardware implemented state machines, and/or any combination thereof for implementing the security vulnerability detector 118 of FIG. 2 and the vulnerability processor model generator 218 of FIG. 3 are shown in FIGS. 6, 7, and 8. The machine readable instructions may be one or more executable program(s) or portion(s) of one or more executable program(s) for execution by a computer processor such as the processor 912 shown in the example processor platform 900 discussed below in connection with FIG. 9. The program(s) may be embodied in software stored on a non-transitory computer readable storage medium such as a CD-ROM, a floppy disk, a hard drive, a DVD, a Blu-ray disk, or a memory associated with the processor 912, but the entire program(s) and/or parts thereof could alternatively be executed by a device other than the processor 912 and/or embodied in firmware or dedicated hardware. Further, although the example program(s) is/are described with reference to the flowcharts illustrated in FIGS. 6, 7, and 8, many other methods of implementing the example security vulnerability detector 118 and/or the vulnerability processor model generator 218 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 6, 7, and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions 600, which may be executed to implement the example security vulnerability detector 118 of FIGS. 1 and 2 to identify one or more security vulnerabilities of a network. The example of FIG. 6 includes a training phase 602 and an inference phase 604. During the example training phase 602, the vulnerability processor model generator 218 trains one or more artificial intelligence models to identify and/or otherwise detect one or more kills chains based on vulnerability training data. The example training phase 602 includes block 606 and is discussed further in conjunction with FIG. 7. During the example inference phase 604 the artificial intelligence model implemented at the example security vulnerability detector 118 can detect and/or obviate one or more kill chains based on potential vulnerabilities detected by the example OS-based security vulnerability detector 204 and/or the example cloud-based security vulnerability detector 208. The example inference phase 604 includes blocks 608, 610, 612, 614, 616, 618, 620, 622, 624, 626, 628, 630, 632, 634, and 636 and is discussed below in conjunction with FIG. 6.

The machine-readable instructions 600 begin at block 606 of the training phase 602 where the example vulnerability processor model generator 218 trains an artificial intelligence model that can be executed at the vulnerability processor 216. Referring now to the inference phase 604, at block 608, the example resource monitor 202 monitors resource activity in a resource of the network 114 and/or a resource of the cloud 102. For example, the compute resource monitor 202a can monitor one or more compute resources of the network 114 and/or the cloud 102, the network resource monitor 202b can monitor one or more network resources of the network 114 and/or the cloud 102, and/or the example storage resource monitor 202c can monitor one or more storage resources of the network 114 and/or the cloud 102. At block 610, the example resource monitor 202 determines whether a threshold amount of resource activity has been monitored. For example, the threshold amount of resource activity can correspond to a threshold amount of data to generate a baseline report. If the example resource monitor 202 determines that the threshold amount of resource activity has been met (block 610: YES), the machine-readable instructions 600 proceed to block 612. If the example resource monitor 202 determines that the threshold amount of resource activity has not been met (block 610: NO), the machine-readable instructions 600 proceed to block 608.

At block 612, the example OS-based security vulnerability detector 204 determines OS-based security vulnerabilities in the network 114. At block 614, the example OS-based security vulnerability detector 204 stores an indication of one or more OS-based security vulnerabilities, if any, in the database 222. At block 616, the example cloud provider determiner 206 determines whether the resource activity corresponds to cloud assets. For example, the cloud provider determiner 206 can access a policy that indicates whether the network 114 includes a cloud. Additionally or alternatively, the example cloud provider determiner 206 can use techniques to determine whether the network includes virtualized assets to determine if the network 114 includes cloud assets.

If the example cloud provider determiner 206 determines that the resource activity corresponds to cloud assets (block 616: YES), the machine-readable instructions 600 proceed to block 618. If the example cloud provider determiner 206 determines that the resource activity does not corresponds to cloud assets (block 616: NO), the machine-readable instructions 600 proceed to block 626. At block 618, the example cloud provider determiner 206 determines the cloud provider of the cloud 102.

At block 620, the example cloud-based security vulnerability detector 208 determines cloud-based security vulnerabilities of the network 114 and/or the cloud 102. Example computer-readable instructions that may be used to implement block 620 are described below in connection with FIG. 8. At block 622, the example cloud-based security vulnerability detector 208 determines whether cloud-based security vulnerabilities have been detected. If the example cloud-based security vulnerability detector 208 determines that cloud-based security vulnerabilities have been detected (block 622: YES), the machine-readable instructions 600 proceed to block 624. If the example cloud-based security vulnerability detector 208 determines that no cloud-based security vulnerabilities have been detected (block 624: NO), the machine-readable instructions 600 proceed to block 626.

At block 624, the example cloud-based security vulnerability detector 208 stores an indication of the cloud-based security vulnerabilities in the database 222. At block 626, the example vulnerability processor 216 correlates the OS-based security vulnerabilities and the cloud-based security vulnerabilities to generate one or more story graphs associated with the network 114 and/or the cloud 102. At block 628, the example vulnerability processor 216 generates one or more story graphs associated with the network 114 and/or the cloud 102. At block 630, the example report generator 220 generates a report. For example, the report includes one or more story graphs indicative of the activity at a suspected device and/or activity related to the suspected device and/or one or more remediation actions that can be selected to be executed by the vulnerability processor 216 to obviate the security vulnerabilities. The report generated by the example report generator 220 can additionally or alternatively include each of the potential vulnerabilities detected by the OS-based security vulnerability detector 204 and the cloud-based security vulnerability detector 208, threat intelligence feeds associated with each of the potential vulnerabilities.

At block 632, the vulnerability processor 216 executes one or more remediation actions to obviate the one or more potential vulnerabilities detected by the example OS-based security vulnerability detector 204 and/or the example cloud-based security vulnerability detector 208. At block 634, the example report generator 220 transmits the report to a user and/or a computer security entity (e.g., an SOC, an IT department, etc.). At block 636, the example resource monitor 202 determines whether to continue monitoring the network 114. For example, a condition that could cause the resource monitor 202 to determine not to continue monitoring the network 114 can include a shutdown of services associated with the user and/or computer security entity. If the example resource monitor 202 determines to continue monitoring (block 636: YES), the machine-readable instructions 600 proceed to block 608. If the example resource monitor 202 determines not to continue monitoring (block 636: NO), the machine-readable instructions 600 terminate.

FIG. 7 is a flowchart representative of example machine readable instructions to implement block 606 of FIG. 6. The machine-readable instructions may be executed to implement the example security vulnerability detector 118 of FIGS. 1 and 2 to train one or more artificial intelligence models to identify cloud-based security vulnerabilities. The machine-readable instructions 606 begin at block 702 at which the example network interface 302 obtains training vulnerability data including OS-based vulnerabilities and cloud-based vulnerabilities. At block 704, the example model executor 304 executes the AI model to generate one or more kill chains based on the training vulnerability data.

At block 706, the example model trainer 306 determines whether the model satisfies an error threshold for generating the one or more kills chains. If the example model trainer 306 determines that the model satisfies the error threshold (block 706: YES), the machine-readable instructions 606 proceed to block 710. If the example model trainer 306 determines that the model does not satisfy the error threshold (block 706: NO), the machine-readable instructions 606 proceed to block 708.

At block 708, the example model trainer 306 updates weights associated with the model based on the error threshold comparison. After block 708, the machine-readable instructions 606 proceed to block 704. At block 710, the example model dispatcher 308 dispatches the model to a computing device (e.g., the vulnerability processor 216). At block 712, the example model trainer 306 determines whether to retrain the model. If the example model trainer 306 determines to retrain the model (block 712: YES), the machine-readable instructions 606 return to block 702. If the example model trainer 306 determines not to retrain the model (block 712: NO), the machine-readable instructions 606 return to block 608 of FIG. 6.

FIG. 8 is a flowchart representative of example machine readable instructions to implement block 620 of FIG. 6. The machine-readable instructions of may be executed to implement the example security vulnerability detector 118 of FIGS. 1 and 2 to determine cloud-based security vulnerabilities. The machine-readable instructions 620 begin at block 802 at which the example cloud configuration auditor 210 audits the cloud configuration of the cloud 102. At block 804, the example cloud configuration auditor 210 determines whether it detects a vulnerability in the cloud configuration of the cloud 102.

If the example cloud configuration auditor 210 does detect a vulnerability in the cloud configuration of the cloud 102 (block 804: YES), the machine-readable instructions 620 proceed to block 806. If the example cloud configuration auditor 210 does not detect a vulnerability in the cloud configuration of the cloud 102 (block 804: NO), the machine-readable instructions 620 proceed to block 808. At block 806, the example cloud configuration auditor 210 stores an indication of any vulnerabilities in the cloud configuration of the cloud 102 in the database 222.

At block 808, the example cloud API log auditor 212 audits the cloud API log 112. At block 810, the example cloud API log auditor 212 determines whether it detects a vulnerability in the cloud API log 112. If the example cloud API log auditor 212 does detect a vulnerability in the cloud API log 112 (block 810: YES), the machine-readable instructions 620 proceed to block 812. If the example cloud API log auditor 212 does not detect a vulnerability in the cloud API log 112 (block 810: NO), the machine-readable instructions 620 proceed to block 814. At block 812, the example cloud API log auditor 212 stores an indication of any vulnerabilities in the cloud API log 112 in the database 222.

At block 814, the example identification proxy monitor 214 audits the IAM device 108. At block 816, the example identification proxy monitor 214 determines whether an entity requesting authorization is in violation of the whitelist. If the example identification proxy monitor 214 does detect an entity requesting authorization is in violation of the whitelist (block 816: YES), the machine-readable instructions 620 proceed to block 818. If the example identification proxy monitor 214 does not detect an entity requesting authorization is in violation of the whitelist (block 816: NO), the machine-readable instructions 620 proceed to block 820. At block 818, the example identification proxy monitor 214 stores an indication of any vulnerabilities in the IAM manager 108 in the database 222.

At block 820, the example cloud configuration auditor 210 monitors the cloud configuration logs of the cloud 102. At block 822, the example cloud configuration auditor 210 determines whether it detects a vulnerability in the instance metadata of one or more services of the cloud 102. If the example cloud configuration auditor 210 does detect a vulnerability in the instance metadata of the one or more services of the cloud 102 (block 822: YES), the machine-readable instructions 620 proceed to block 824. If the example cloud configuration auditor 210 does not detect a vulnerability in the instance metadata of the one or more services of the cloud 102 (block 822: NO), the machine-readable instructions 620 return to block 622. At block 824, the example cloud configuration auditor 210 stores an indication of any vulnerabilities in the instance metadata of the one or more services of the cloud 102 in the database 222. The machine-readable instructions 620 then return to block 622 of FIG. 6.

Figure 9:
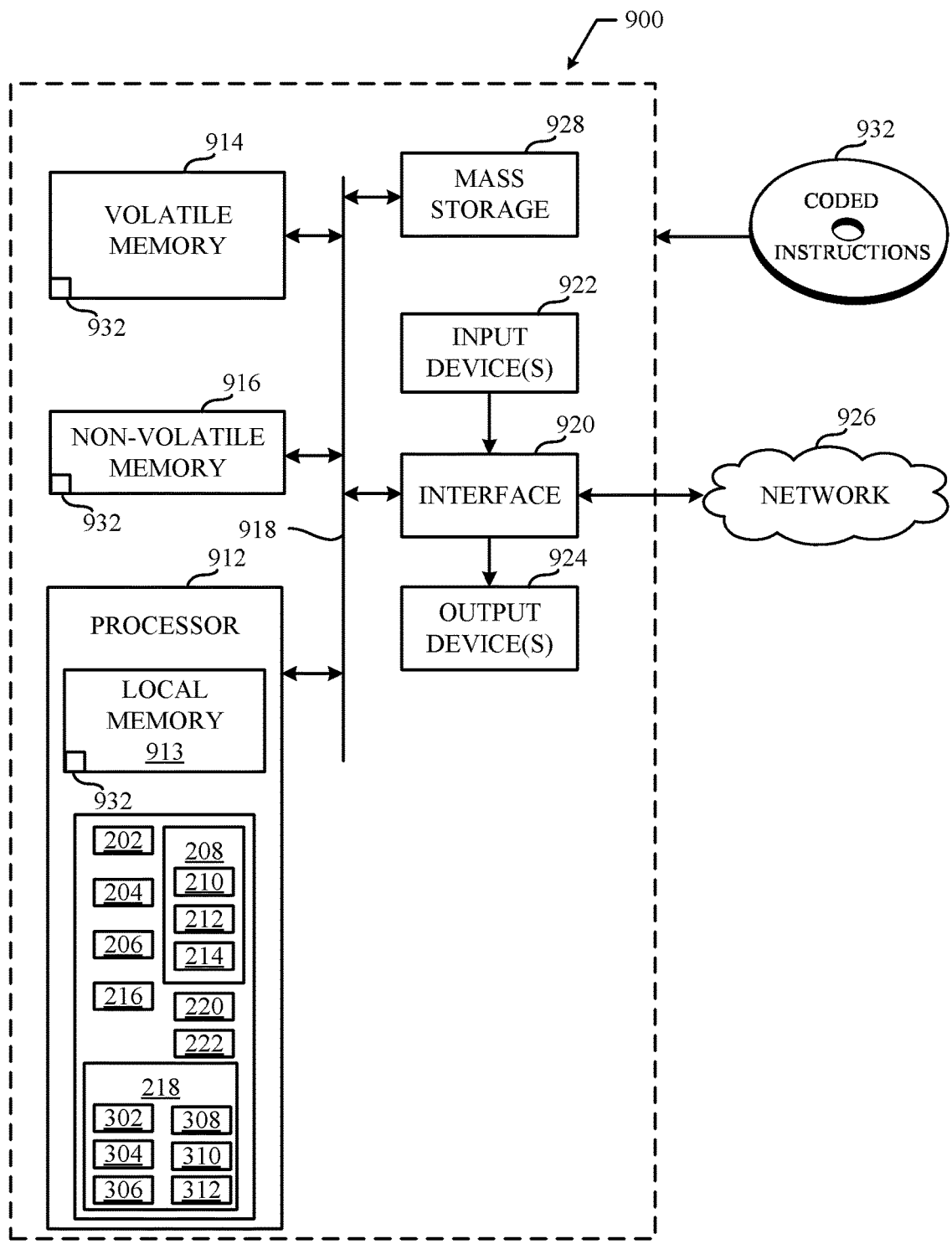
FIG. 9 is a block diagram of an example processing platform structured to execute the instructions of FIGS. 5, 6, and 7 to implement the security vulnerability detector of FIGS. 1 and 2.

FIG. 9 is a block diagram of an example processing platform structured to execute the instructions of FIGS. 6, 7, and 8 to implement the security vulnerability detector 118 of FIGS. 1 and 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor-based (e.g., silicon based) device. In this example, the processor 912 implements the example resource monitor 202, the example OS-based security vulnerability detector 204, the example cloud provider determiner 206, the example cloud-based security vulnerability detector 208, the example cloud configuration auditor 210, the example cloud API log auditor 212, the example identification proxy monitor 214, the example vulnerability processor 216, the example vulnerability processor model generator 218, the example report generator 220, the example database 222 and/or, more generally, the example security vulnerability detector 118 of FIG. 1 and/or the example network interface 302, the example model executor 304, the example model trainer 306, the example model dispatcher 308, the example model database 310, the example training data database 312, and/or, more generally, the example vulnerability processor model generator 218 of FIG. 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

Machine executable instructions 932 represented by FIGS. 6, 7, and 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus, and articles of manufacture have been disclosed that identify and report cloud-based security vulnerabilities. The example methods, apparatus, and articles of manufacture disclosed herein reduce OS-based security vulnerabilities and cloud-based security vulnerabilities in a network and/or cloud. The disclosed methods, apparatus, and articles of manufacture improve the security of a computing device and prevent malicious activities. The disclosed methods, apparatus, and articles of manufacture improve the efficiency of using a computing device by improving the functionality of the computing device by removing and/or otherwise obviating malicious software executing on the computing device to allow for more efficient use of the computing device. The disclosed methods, apparatus, and articles of manufacture are accordingly directed to one or more improvement(s) in the functioning of a computer.

Example methods, apparatus, systems, and articles of manufacture to methods and apparatus to identify and report cloud-based security vulnerabilities are disclosed herein. Further examples and combinations thereof include the following:

Example 1 includes an apparatus comprising a security vulnerability detector to, in response to a resource monitor monitoring a threshold amount of resource activity in a resource of a cloud computing environment, determine one or more security vulnerabilities associated with the resource and the cloud computing environment, a vulnerability processor to correlate the one or more security vulnerabilities with one or more kill chains to exploit at least one security vulnerability in the cloud computing environment, and a report generator to generate a report including a story graph, the story graph indicating a subset of at least one of (a) the one or more security vulnerabilities associated with the one or more kill chains, (b) one or more remediation actions to obviate the one or more security vulnerabilities, or (c) threat intelligence feeds associated with the one or more security vulnerabilities.

Example 2 includes the apparatus of example 1, wherein the story graph is indicative of operations executed at a device associated with the at least one security vulnerability in the cloud computing environment and operations related to the device associated with the at least one security vulnerability in the cloud computing environment.

Example 3 includes the apparatus of example 2, wherein (1) the operations executed at the device associated with the at least one security vulnerability in the cloud computing environment include processing operations, file access operations, and registry operations, and (2) the operations related to the device associated with the at least one security vulnerability in the cloud computing environment include virtual firewalls associated with the device, identification and access management roles of the device, and a location of the device.

Example 4 includes the apparatus of example 1, wherein the vulnerability processor is to, in response to the security vulnerability detector detecting the one or more security vulnerabilities, execute the one or more remediation actions to obviate the one or more security vulnerabilities.

Example 5 includes the apparatus of example 1, wherein the threshold amount of resource activity is a threshold to be satisfied to generate a baseline report, the baseline report indicating at least one of (a) expected communications between devices in the cloud computing environment, (b) expected configurations for the cloud computing environment, and (c) expected calls to an application programming interface associated with the cloud computing environment.

Example 6 includes the apparatus of example 1, further including an operating system-based security vulnerability detector to detect one or more security vulnerabilities based on an operating system of the resource, and a cloud-based security vulnerability detector to detect the one or more security vulnerabilities based on the cloud computing environment.

Example 7 includes the apparatus of example 6, further including a cloud configuration auditor to audit a configuration of the cloud computing environment, in response to detecting a first vulnerability in the configuration, store an indication of the first vulnerability in a database, monitor a first log associated with the configuration of the cloud computing environment, and in response to detecting a second vulnerability in the first log associated with the configuration of the cloud computing environment, store a second indication of the second vulnerability in the database, a cloud application programming interface (API) log auditor to audit a second log associated with an API of the cloud computing environment, and in response to detecting a third vulnerability in the second log associated with the API of the cloud computing environment, store a third indication of the third vulnerability in the database, and an identification proxy monitor to monitor an identification and access management device, and in response to detecting a fourth vulnerability at the identification and access management device, store a fourth indication of the fourth vulnerability in the database.

Example 8 includes the apparatus of example 1, wherein the resource includes at least one of a compute resource, a network resource, or a storage resource.

Example 9 includes a non-tangible computer readable storage medium comprising instructions that, when executed, cause one or more processors to at least in response to monitoring a threshold amount of resource activity in a resource of a cloud computing environment, determine one or more security vulnerabilities associated with the resource and the cloud computing environment, correlate the one or more security vulnerabilities with one or more kill chains to exploit at least one security vulnerability in the cloud computing environment, and generate a report including a story graph, the story graph indicating a subset of at least one of (a) the one or more security vulnerabilities associated with the one or more kill chains, (b) one or more remediation actions to obviate the one or more security vulnerabilities, or (c) threat intelligence feeds associated with the one or more security vulnerabilities.

Example 10 includes the non-tangible computer readable storage medium of example 9, wherein the story graph is indicative of operations executed at a device associated with the at least one security vulnerability in the cloud computing environment and operations related to the device associated with the at least one security vulnerability in the cloud computing environment.

Example 11 includes the non-tangible computer readable storage medium of example 10, wherein (1) the operations executed at the device associated with the at least one security vulnerability in the cloud computing environment include processing operations, file access operations, and registry operations, and (2) the operations related to the device associated with the at least one security vulnerability in the cloud computing environment include virtual firewalls associated with the device, identification and access management roles of the device, and a location of the device.

Example 12 includes the non-tangible computer readable storage medium of example 9, wherein the instructions, when executed, cause the one or more processors to, in response to detecting the one or more security vulnerabilities, execute the one or more remediation actions to obviate the one or more security vulnerabilities.

Example 13 includes the non-tangible computer readable storage medium of example 9, wherein the threshold amount of resource activity is a threshold to be satisfied to generate a baseline report, the baseline report indicating at least one of (a) expected communications between devices in the cloud computing environment, (b) expected configurations for the cloud computing environment, and (c) expected calls to an application programming interface associated with the cloud computing environment.

Example 14 includes the non-tangible computer readable storage medium of example 9, wherein the one or more security vulnerabilities include one or more security vulnerabilities based on an operating system of the resource and one or more security vulnerabilities, the one or more security vulnerabilities based on the cloud computing environment.

Example 15 includes the non-tangible computer readable storage medium of example 14, wherein the instructions, when executed, cause the one or more processors to audit a configuration of the cloud computing environment, in response to detecting a first vulnerability in the configuration, store an indication of the first vulnerability in a database, audit a first log associated with an application programming interface (API) of the cloud computing environment, in response to detecting a second vulnerability in the first log associated with the API of the cloud computing environment, store a second indication of the second vulnerability in the database, monitor an identification and access management device, in response to detecting a third vulnerability at the identification and access management device, store a third indication of the third vulnerability in the database, monitor a second log associated with the configuration of the cloud computing environment, and in response to detecting a fourth vulnerability in the second log associated with the configuration of the cloud computing environment, store a fourth indication of the fourth vulnerability in the database.

Example 16 includes the non-tangible computer readable storage medium of example 9, wherein the resource includes at least one of a compute resource, a network resource, or a storage resource.

Example 17 includes an apparatus comprising means for detecting a security vulnerability to, in response to monitoring a threshold amount of resource activity in a resource of a cloud computing environment, determine one or more security vulnerabilities associated with the resource and the cloud computing environment, means for processing a security vulnerability to correlate the one or more security vulnerabilities with one or more kill chains to exploit at least one security vulnerability in the cloud computing environment, and means for generating a report including a story graph, the story graph indicating a subset of at least one of (a) the one or more security vulnerabilities associated with the one or more kill chains, (b) one or more remediation actions to obviate the one or more security vulnerabilities, or (c) threat intelligence feeds associated with the one or more security vulnerabilities.

Example 18 includes the apparatus of example 17, wherein the story graph is indicative of operations executed at a device associated with the at least one security vulnerability in the cloud computing environment and operations related to the device associated with the at least one security vulnerability in the cloud computing environment.

Example 19 includes the apparatus of example 18, wherein (1) the operations executed at the device associated with the at least one security vulnerability in the cloud computing environment include processing operations, file access operations, and registry operations, and (2) the operations related to the device associated with the at least one security vulnerability in the cloud computing environment include virtual firewalls associated with the device, identification and access management roles of the device, and a location of the device.

Example 20 includes the apparatus of example 17, wherein the means for processing a vulnerability is to, in response to the means for detecting a security vulnerability detecting the one or more security vulnerabilities, execute the one or more remediation actions to obviate the one or more security vulnerabilities.

Example 21 includes the apparatus of example 17, wherein the threshold amount of resource activity is a threshold to be satisfied to generate a baseline report, the baseline report indicating at least one of (a) expected communications between devices in the cloud computing environment, (b) expected configurations for the cloud computing environment, and (c) expected calls to an application programming interface associated with the cloud computing environment.

Example 22 includes the apparatus of example 17, further including means for detecting an operating system-based security vulnerability to detect one or more security vulnerabilities based on an operating system of the resource, and means for determining cloud-based security vulnerabilities to detect the one or more security vulnerabilities based on the cloud computing environment.

Example 23 includes the apparatus of example 22, further including means for auditing cloud configurations to audit a configuration of the cloud computing environment, in response to detecting a first vulnerability in the configuration, store an indication of the first vulnerability in a database, monitor a first log associated with the configuration of the cloud computing environment, and in response to detecting a second vulnerability in the first log associated with the configuration of the cloud computing environment, store a second indication of the second vulnerability in the database, means for auditing cloud application programming interface (API) logs to audit a second log associated with an API of the cloud computing environment, and in response to detecting a third vulnerability in the second log associated with the API of the cloud computing environment, store a third indication of the third vulnerability in the database, and means for monitoring an identification to monitor an identification and access management device, and in response to detecting a fourth vulnerability at the identification and access management device, store a fourth indication of the fourth vulnerability in the database.

Example 24 includes the apparatus of example 17, wherein the resource includes at least one of a compute resource, a network resource, or a storage resource.

Example 25 includes a method comprising in response to monitoring a threshold amount of resource activity in a resource of a cloud computing environment, determining one or more security vulnerabilities associated with the resource and the cloud computing environment, correlating the one or more security vulnerabilities with one or more kill chains to exploit at least one security vulnerability in the cloud computing environment, and generating a report including a story graph, the story graph indicating a subset of at least one of (a) the one or more security vulnerabilities associated with the one or more kill chains, (b) one or more remediation actions to obviate the one or more security vulnerabilities, or (c) threat intelligence feeds associated with the one or more security vulnerabilities.

Example 26 includes the method of example 25, wherein the story graph is indicative of operations executed at a device associated with the at least one security vulnerability in the cloud computing environment and operations related to the device associated with the at least one security vulnerability in the cloud computing environment.

Example 27 includes the method of example 26, wherein (1) the operations executed at the device associated with the at least one security vulnerability in the cloud computing environment include processing operations, file access operations, and registry operations, and (2) the operations related to the device associated with the at least one security vulnerability in the cloud computing environment include virtual firewalls associated with the device, identification and access management roles of the device, and a location of the device.

Example 28 includes the method of example 25, further including in response to detecting the one or more security vulnerabilities, execute the one or more remediation actions to obviate the one or more security vulnerabilities.

Example 29 includes the method of example 25, wherein the threshold amount of resource activity is a threshold to be satisfied to generate a baseline report, the baseline report indicating at least one of (a) expected communications between devices in the cloud computing environment, (b) expected configurations for the cloud computing environment, and (c) expected calls to an application programming interface associated with the cloud computing environment.

Example 30 includes the method of example 25, wherein the one or more security vulnerabilities include one or more security vulnerabilities based on an operating system of the resource and one or more security vulnerabilities, the one or more security vulnerabilities based on the cloud computing environment.

Example 31 includes the method of example 30, further including auditing a configuration of the cloud computing environment, in response to detecting a first vulnerability in the configuration, storing an indication of the first vulnerability in a database, auditing a first log associated with an application programming interface (API) of the cloud computing environment, in response to detecting a second vulnerability in the first log associated with the API of the cloud computing environment, storing a second indication of the second vulnerability in the database, monitoring an identification and access management device, in response to detecting a third vulnerability at the identification and access management device, storing a third indication of the third vulnerability in the database, monitoring a second log associated with the configuration of the cloud computing environment, and in response to detecting a fourth vulnerability in the second log associated with the configuration of the cloud computing environment, storing a fourth indication of the fourth vulnerability in the database.

Example 32 includes the method of example 25, wherein the resource includes at least one of a compute resource, a network resource, or a storage resource.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory;
   instructions; and
   processor circuitry to execute the instructions to at least:
      assess a first security vulnerability associated with an application programming interface (API) of a cloud compute network, the first security vulnerability corresponding to at least one call to the API that deviates from a baseline report, the baseline report based on at least one communication in the cloud compute network; and
      assess a second security vulnerability associated with identity and access management in the cloud compute network based on an entity in the cloud compute network permitted to access a service provided by the cloud compute network, the second security vulnerability corresponding to an unauthorized request to access at least one of a device of the cloud compute network or the service provided by the cloud compute network,
   wherein the processor circuitry is to assess a third security vulnerability in a configuration of the cloud compute network based on at least one of (a) a policy associated with the cloud compute network or (b) metadata associated with the service provided by the cloud compute network, and
   wherein the processor circuitry is to assess the third security vulnerability based on whether a change to the metadata associated with the service occurs outside of a scheduled period of at least one of deployment or maintenance.

2. The apparatus of claim 1, wherein the processor circuitry is to assess the second security vulnerability associated with the identity and access management in the cloud compute network based on at least one rule, the at least one rule based on a policy associated with the cloud compute network.

3. The apparatus of claim 1, wherein the processor circuitry is to assess the second security vulnerability associated with the identity and access management in the cloud compute network based on a list of which entities are permitted to access the service provided by the cloud compute network.

4. The apparatus of claim 1, wherein the at least one communication in the cloud compute network includes one or more communications between one or more entities in the cloud compute network, one or more resources of the cloud compute network, and the API.

5. The apparatus of claim 1, wherein the baseline report is to indicate one or more expected communications between one or more entities in the cloud compute network, one or more resources of the cloud compute network, and the API.

6. A non-transitory computer readable medium comprising instructions that, when executed, cause processor circuitry to at least:
   check for a first security vulnerability associated with an application programming interface (API) of a cloud compute network, the first security vulnerability corresponding to at least one call to the API that deviates from a baseline report, the baseline report based on at least one communication in the cloud compute network; and
   check for a second security vulnerability associated with identity and access management in the cloud compute network, the check for the second security vulnerability based on an entity in the cloud compute network permitted to access a service provided by the cloud compute network, the second security vulnerability corresponding to an unauthorized request to access at least one of a device of the cloud compute network or the service provided by the cloud compute network,
   wherein the instructions are to cause the processor circuitry to check for a third security vulnerability in a configuration of the cloud compute network based on at least one of (a) a policy associated with the cloud compute network or (b) metadata associated with the service provided by the cloud compute network, and
   wherein the instructions are to cause the processor circuitry to check for the third security vulnerability based on whether a change to the metadata associated with the service occurs outside of a scheduled period of at least one of deployment or maintenance.

7. The non-transitory computer readable medium of claim 6, wherein the instructions are to cause the processor circuitry to check for the second security vulnerability associated with the identity and access management in the cloud compute network based on at least one rule, the at least one rule based on a policy associated with the cloud compute network.

8. The non-transitory computer readable medium of claim 6, wherein the instructions are to cause the processor circuitry to check for the second security vulnerability associated with the identity and access management in the cloud compute network, the check for the second security vulnerability based on a list of which entities are permitted to access the service provided by the cloud compute network.

9. The non-transitory computer readable medium of claim 6, wherein the at least one communication in the cloud compute network includes one or more communications between one or more entities in the cloud compute network, one or more resources of the cloud compute network, and the API.

10. The non-transitory computer readable medium of claim 6, wherein the baseline report is to indicate one or more expected communications between one or more entities in the cloud compute network, one or more resources of the cloud compute network, and the API.

11. An apparatus comprising:
means for auditing cloud application programming interface (API) logs for a first security vulnerability associated with an API of a cloud compute network, the first security vulnerability corresponding to at least one call to the API that deviates from a baseline report, the baseline report based on at least one communication in the cloud compute network; and
means for auditing an identification for a second security vulnerability associated with identity and access management in the cloud compute network, the auditing of the identification based on an entity in the cloud compute network permitted to access a service provided by the cloud compute network, the second security vulnerability corresponding to an unauthorized request to access at least one of a device of the cloud compute network or the service provided by the cloud compute network,
further including means for auditing cloud configurations for a third security vulnerability in a configuration of the cloud compute network, the auditing of the configuration based on at least one of (a) a policy associated with the cloud compute network or (b) metadata associated with the service provided by the cloud compute network, and
wherein the means for auditing cloud configurations for the third security vulnerability is to audit the configuration of the cloud compute network based on whether a change to the metadata associated with the service occurs outside of a scheduled period of at least one of deployment or maintenance.

12. The apparatus of claim 11, wherein the means for auditing the identification for the second vulnerability is to audit the identification based on at least one rule, the at least one rule based on a policy associated with the cloud compute network.

13. The apparatus of claim 11, wherein the means for auditing the identification for the second vulnerability is to audit the identification based on a list of which entities are permitted to access the service provided by the cloud compute network.

14. The apparatus of claim 11, wherein the at least one communication in the cloud compute network includes one or more communications between one or more entities in the cloud compute network, one or more resources of the cloud compute network, and the API.

15. The apparatus of claim 11, wherein the baseline report is to indicate one or more expected communications between one or more entities in the cloud compute network, one or more resources of the cloud compute network, and the API.

16. A method comprising:
monitoring for a first security vulnerability associated with an application programming interface (API) of a cloud compute network, the first security vulnerability corresponding to at least one call to the API that deviates from a baseline report, the baseline report based on at least one communication in the cloud compute network; and
monitoring for a second security vulnerability associated with identity and access management in the cloud compute network, the monitoring for the second security vulnerability based on an entity in the cloud compute network permitted to access a service provided by the cloud compute network, the second security vulnerability corresponding to an unauthorized request to access at least one of a device of the cloud compute network or the service provided by the cloud compute network,
further including monitoring for a third security vulnerability in a configuration of the cloud compute network based on at least one of (a) a policy associated with the cloud compute network or (b) metadata associated with the service provided by the cloud compute network, and
further including monitoring for the third security vulnerability based on whether a change to the metadata associated with the service occurs outside of a scheduled period of at least one of deployment or maintenance.

17. The method of claim 16, further including monitoring for the second security vulnerability associated with the identity and access management in the cloud compute network based on at least one rule, the at least one rule based on a policy associated with the cloud compute network.

18. The method of claim 16, further including checking for the second security vulnerability associated with the identity and access management in the cloud compute network based on a list of which entities are permitted to access the service provided by the cloud compute network.

19. The method of claim 16, wherein the at least one communication in the cloud compute network includes one or more communications between one or more entities in the cloud compute network, one or more resources of the cloud compute network, and the API.

20. The method of claim 16, wherein the baseline report is to indicate one or more expected communications between one or more entities in the cloud compute network, one or more resources of the cloud compute network, and the API.

* * * * *